(12) United States Patent
Klotz et al.

(10) Patent No.: US 7,114,106 B2
(45) Date of Patent: Sep. 26, 2006

(54) SCALABLE NETWORK ATTACHED STORAGE (NAS) TESTING TOOL

(75) Inventors: Steve Klotz, Austin, TX (US); Michael D. Connell, Pflugerville, TX (US); Mark J. Lanteigne, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 707 days.

(21) Appl. No.: 10/201,343

(22) Filed: Jul. 22, 2002

(65) Prior Publication Data

US 2004/0015722 A1 Jan. 22, 2004

(51) Int. Cl.
*G01R 31/28* (2006.01)
*G06F 3/06* (2006.01)

(52) U.S. Cl. .................. 714/712; 714/25; 702/122

(58) Field of Classification Search ............... 714/712, 714/25, 15, 29, 42; 702/120, 122
See application file for complete search history.

(56) References Cited

U.S. PATENT DOCUMENTS

| | | | |
|---|---|---|---|
| 4,439,859 A * | 3/1984 | Donnan ...................... 714/748 |
| 4,684,885 A | 8/1987 | Chapman et al. ......... 324/73 R |
| 5,303,166 A | 4/1994 | Amalfitano et al. ... 364/551.01 |
| 5,323,403 A | 6/1994 | Elliott ....................... 371/37.6 |
| 5,541,942 A | 7/1996 | Strouss |
| 5,574,855 A | 11/1996 | Rosich et al. |
| 5,586,204 A | 12/1996 | Noble et al. ................ 382/282 |
| 5,615,335 A | 3/1997 | Onffroy et al. |
| 5,668,815 A | 9/1997 | Gittinger et al. |
| 5,841,975 A | 11/1998 | Layne et al. ........... 395/200.33 |
| 5,896,368 A | 4/1999 | Dahlman et al. |
| 5,938,743 A | 8/1999 | Nahidipour et al. |
| 5,983,002 A | 11/1999 | Adams |
| 6,005,731 A | 12/1999 | Foland et al. |
| 6,023,581 A | 2/2000 | Matsuura |
| 6,044,398 A | 3/2000 | Marullo et al. ............. 709/219 |
| 6,044,480 A | 3/2000 | Keen |
| 6,141,323 A | 10/2000 | Rusu et al. ................. 370/236 |
| 6,148,417 A * | 11/2000 | da Silva ....................... 714/25 |
| 6,195,769 B1 | 2/2001 | Prickett ....................... 714/49 |

(Continued)

FOREIGN PATENT DOCUMENTS

EP 00595036 A1 5/1994

OTHER PUBLICATIONS

Ramtest, 1986, 7 pages, http://www.simtel.net/pub/pd/47826.html.

(Continued)

*Primary Examiner*—Guy Lamarre
*Assistant Examiner*—Fritz Alphonse
(74) *Attorney, Agent, or Firm*—Workman Nydegger

(57) ABSTRACT

Embodiments of the present invention generally provide a system and method for testing integrity of data transmitted across a network connection. In one embodiment, the method generally includes creating one or more test threads on one or more test clients attached to a server through the network connection. The method further includes, for each test thread, generating a data load on the data connection by repetitively writing test data patterns to a common data file on the server, reading data patterns from the common data file, and comparing the data patterns read from the common data file to the test data patterns written to the common data file to detect data corruptions. The method may further include measuring data throughput between the one or more test clients and the server and generating debug information if a data corruption is detected by one of the test threads.

26 Claims, 21 Drawing Sheets

U.S. PATENT DOCUMENTS

| | | | |
|---|---|---|---|
| 6,273,622 B1 | 8/2001 | Ben-David | 395/200.6 |
| 6,438,719 B1 | 8/2002 | Lindberg et al. | |
| 6,499,121 B1 | 12/2002 | Roy et al. | |
| 6,516,337 B1 | 2/2003 | Tripp et al. | |
| 6,519,228 B1 * | 2/2003 | Creamer et al. | 379/15.01 |
| 6,553,513 B1 | 4/2003 | Swoboda et al. | |
| 6,618,823 B1 | 9/2003 | West | |
| 6,640,238 B1 | 10/2003 | Bowman-Amuah | |
| 6,665,265 B1 * | 12/2003 | Raza | 370/231 |
| 6,754,853 B1 | 6/2004 | DeKoning et al. | |
| 6,871,295 B1 * | 3/2005 | Ulrich et al. | 714/6 |
| 6,883,065 B1 * | 4/2005 | Pittelkow et al. | 711/114 |
| 2002/0078408 A1 | 6/2002 | Chambers et al. | |
| 2003/0037203 A1 | 2/2003 | Suresh | |
| 2003/0110419 A1 | 6/2003 | Banerjee et al. | |
| 2004/0015317 A1 | 1/2004 | Klotz et al. | |
| 2004/0015744 A1 | 1/2004 | Klotz et al. | |
| 2004/0015745 A1 | 1/2004 | Klotz et al. | |
| 2004/0015761 A1 | 1/2004 | Klotz et al. | |
| 2004/0015762 A1 | 1/2004 | Klotz et al. | |
| 2004/0015775 A1 | 1/2004 | Klotz et al. | |

OTHER PUBLICATIONS

Iometer User's Guide by David D. Levine, Oct. 8, 1998, 68 pages, http://www.intel.com/design/servers/devtools/iometer/downlowad.htm.
U.S. Appl. No. 10/201,749, filed Jul. 22, 2002, Klotz et al.
U.S. Appl. No. 10/201,344, filed Jul. 22, 2002, Klotz et al.
U.S. Appl. No. 10/201,500, filed Jul. 22, 2002, Klotz et al.
U.S. Appl. No. 10/201,754, filed Jul. 22, 2002, Klotz et al.
U.S. Appl. No. 10/201,753, filed Jul. 22, 2002, Klotz et al.
U.S. Appl. No. 10/201,511, filed Jul. 22, 2002, Klotz et al.

* cited by examiner

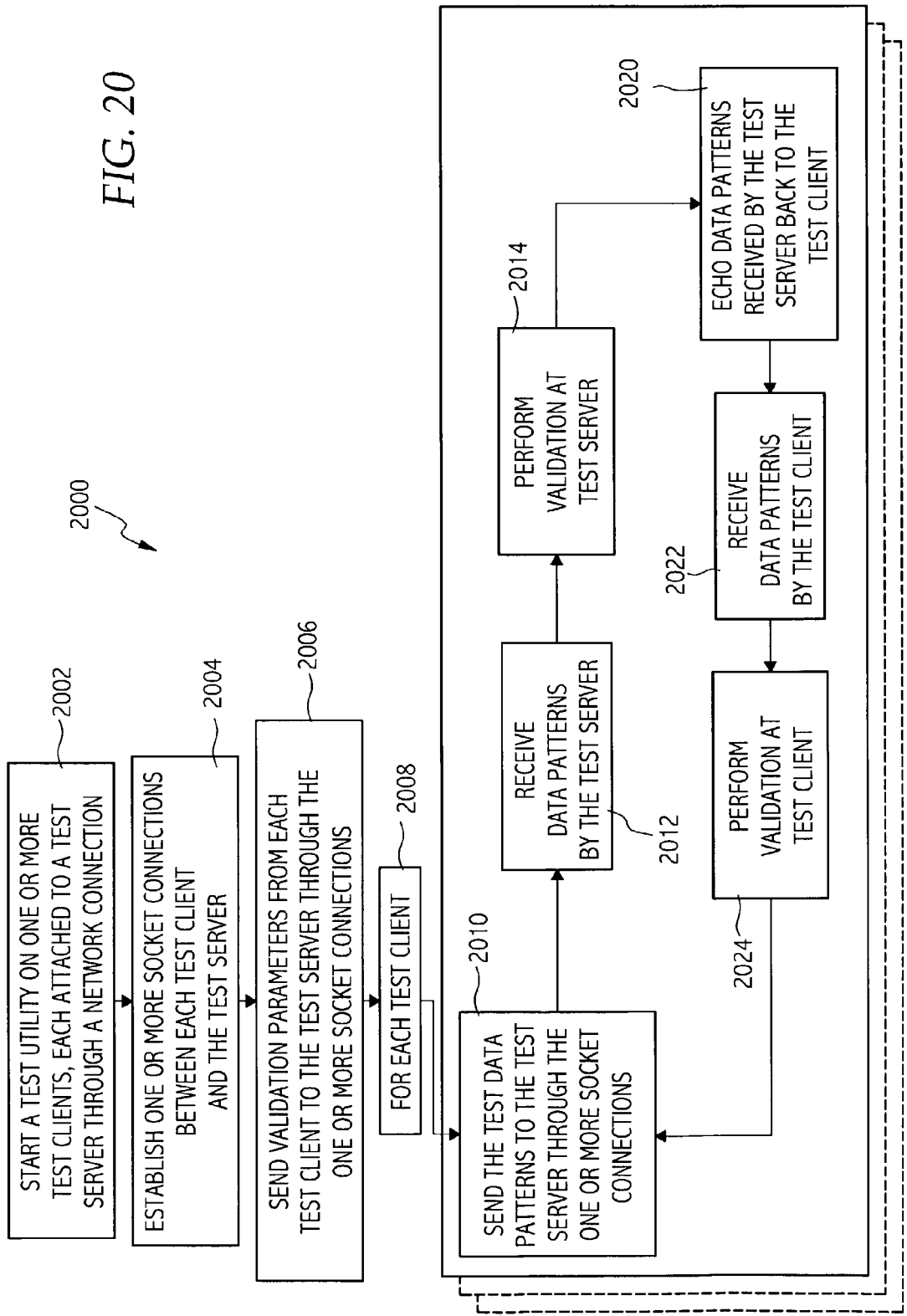

SCALABLE NETWORK ATTACHED STORAGE (NAS) TESTING TOOL

BACKGROUND OF THE INVENTION

1. Field of the Invention

The present invention relates generally to methods and systems for testing computer systems, and in particular, to software based test tools designed to test data and signal integrity under heavy data load conditions.

2. Description of the Related Art

Manufacturers of computer systems or computer system devices commonly use software-based analysis tools to measure performance of their products. These analysis tools typically measure performance in terms of data throughput, or bandwidth, of the system or device. For example, a bandwidth measurement may be taken by reading or writing data to a hard drive while timing the read or write operations (collectively referred to as I/O operations). The slowest component along the data path determines the bandwidth. For example, a fast disk drive may be hampered by a bus with a low bandwidth, a fast network server may be hampered by a low bandwidth network connection, etc. Therefore, manufacturers spend a great amount of effort designing devices and components for maximum bandwidth.

Also of importance to manufacturers, however, is data integrity. In most cases, high bandwidth is irrelevant if data arrives incorrectly. Just as the slowest device in the data path may cause a loss of bandwidth, a single device along the data path that corrupts data may cause a loss of data integrity. Further, a single component within the device may cause the data corruption. For example, a buffer in a switch or router or a software driver for a network interface card may be a source of data corruption.

Data corruptions are more likely to happen when devices in a data path are subjected to a heavy data load caused by I/O operations at or near a maximum bandwidth of the devices. A heavy data load places I/O stress on system devices (and components within the devices) that must respond faster than under normal operating conditions. Conventional analysis tools may place a heavy data load on devices in a system under test while performing rapid I/O operations to measure system bandwidth. However, while measuring system bandwidth, conventional performance analysis tools do not verify data integrity.

Accordingly, there is a need for analysis tools capable of verifying data integrity under heavy load conditions.

SUMMARY OF THE INVENTION

Embodiments of the present invention generally provide a system for testing validity of data transmitted across a network connection. The system generally includes one or more test clients attached to a server through the network connection. A library of test data patterns and a test utility may be installed on each test client. The test client may be configured to create one or more test threads, each configured to load a write buffer with test data patterns from a set of test data patterns from the library, generate a data load on the network connection by repetitively writing test data patterns from the write buffer to a common data file on the server, read data patterns from the common data file, compare the data patterns read from the common data file to the test data patterns written to the common data file to detect data corruptions, and generate debug information if a data corruption is detected. For some embodiments, the server may be a network attached storage (NAS) device.

Embodiments of the present invention may also provide a method for testing integrity of data transmitted between one or more test clients and a server through a network connection. The method generally includes creating one or more test threads and a performance thread on each test client. The method further includes, for each test thread, generating a data load on the network connection by repetitively writing test data patterns to a common data file on the server, reading data patterns from the common data file, and comparing the data patterns read from the common data file to the test data patterns written to the common data file to detect data corruptions. The method may further include measuring data throughput between a test client with the performance thread and generating debug information on a test client if any of the test threads running on the test client detects a data corruption.

Embodiments of the present invention may also provide a computer-readable medium containing a program which, when executed on a computer system, performs operations for validating data transmitted between the computer system and a server through a network connection. The operations generally include creating one or more test threads and a performance thread. The operations further include, for each test thread, generating a data load on the network connection by repetitively writing test data patterns to a common data file on the server, reading data patterns from the common data file, and comparing the data patterns read from the common data file to the test data patterns written to the common data file to detect data corruptions. The operations may further include measuring data throughput between the computer system and the server with the performance thread and generating debug information if a data corruption is detected.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

It is to be noted, however, that the appended drawings illustrate only typical embodiments of this invention, and are, therefore, not to be considered limiting of its scope, for the invention may admit to other equally effective embodiments.

FIG. 20 is a flow diagram illustrating exemplary operations of still another method for testing data validity under data loads generated across one or more socket connections.

DETAILED DESCRIPTION OF THE PREFERRED EMBODIMENTS

The present invention generally provides methods, systems, and articles of manufacture for testing data integrity across a data connection between a test system and a target device under heavy data load conditions. In general, a test utility running on the test system generates a heavy data load by repetitively writing test data patterns to the target device and reading data patterns from the device. To test for data integrity, the test utility compares the data patterns read from the target device to the test patterns written to the target device.

Figure 1:
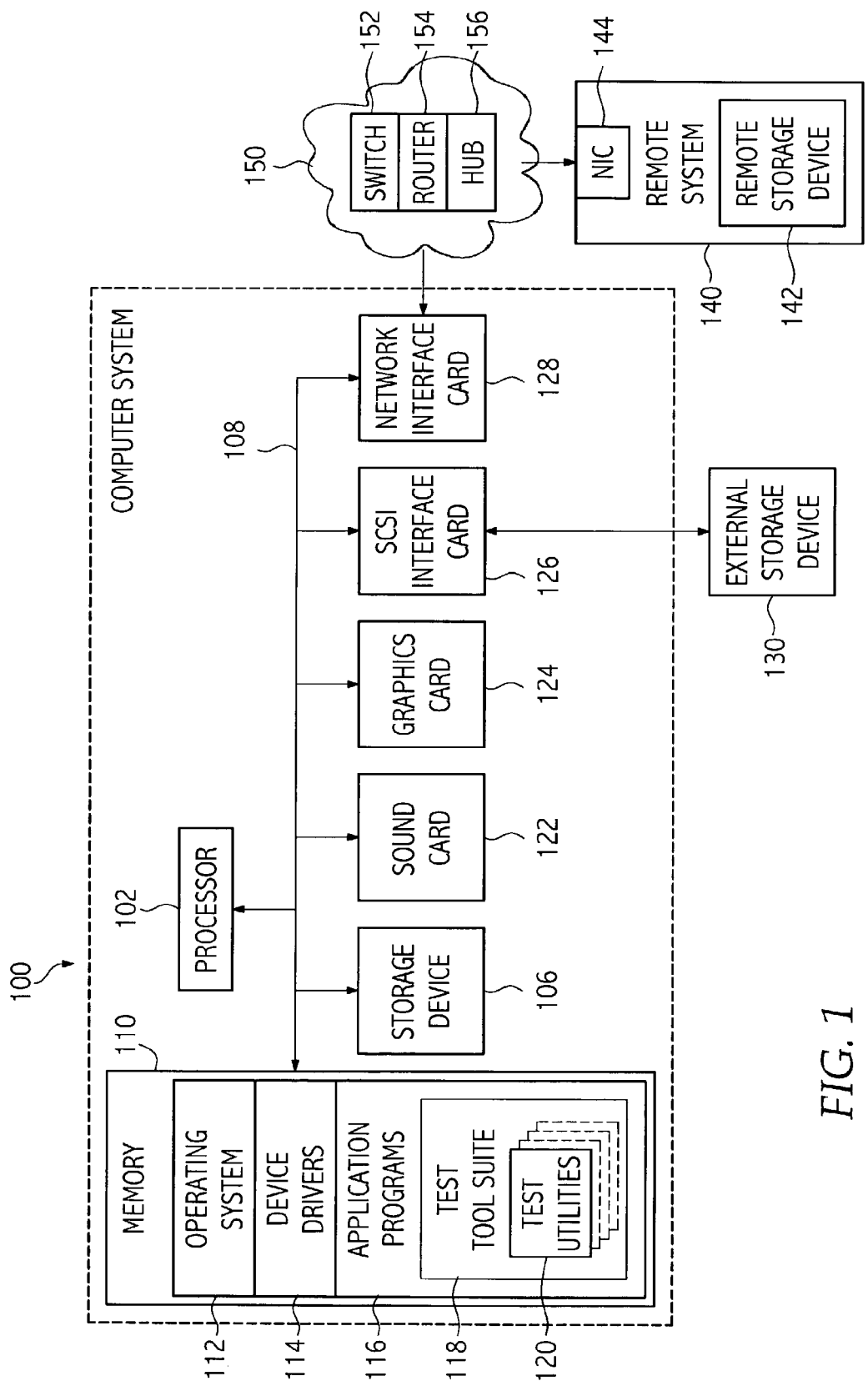
FIG. 1 illustrates an exemplary computer system.

Embodiments of the invention are implemented as program products for use with computer systems. For example, FIG. 1 illustrates a computer system 100 with a suite of test tools 118 according to one embodiment of the present invention. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically includes a multitude of instructions that will be translated by the native computer into a machine-readable format and hence executable instructions. Also, programs typically include variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

AN EXEMPLARY COMPUTER SYSTEM

As illustrated in FIG. 1, the computer system 100 generally includes a processor 102, a memory 110 and a storage device 106, all connected together by a bus 108. The processor may be any suitable processor, such as a Pentium® series processor available from Intel Corp. of Santa Clara, Calif., or a PowerPC® series processor available from International Business Machines of Armonk, N.Y. (IBM). Further, the computer system 100 may include more than one processor 102.

The storage device 106 is preferably a direct access storage device (DASD) and, although it is shown as a single unit, it may be a combination of fixed and/or removable storage devices, such as fixed disk drives, floppy disk drives, tape drives, removable memory cards, or optical storage. The memory 110 may also be one or a combination of memory devices, including random access memory (RAM), nonvolatile or backup memory, (e.g., programmable or flash memories, read-only memories, etc.) and the like. In addition, memory 110 may be considered to include memory physically located external to the computer system 100, for example, any storage capacity used as virtual memory or stored on a mass storage device or on another computer coupled to the computer system 100 via the bus 108. Further, the memory 110 and the storage device 106 may be part of one virtual address space spanning multiple primary and secondary storage devices.

As illustrated, the memory 110 generally includes an operating system 112, device drivers 114, and application programs 116. The operating system 112 may be any suitable operating system that provides a software platform on which the application programs 116 may run. Examples of suitable operating systems include, but are not limited to, DOS, OS/2, Windows, Netware, Unix, Solaris, and Linux.

A device driver is a program that controls a device. A device driver serves as an interface between a device and application programs that access the device. Every device, such as a printer or keyboard, must have a device driver. Examples of other devices having device drivers include a sound card 122, graphics card 124, small computer system interface (SCSI) interface card 126 and network interface card (NIC) 128. Each of these devices includes hardware (controllers, buffers, memory, etc.) and software (the device drivers 114 and software for internal controllers) components that handle data for I/O operations from the processor to read data from or write data to the devices.

Accordingly, a failure of any of these devices or components may result in a data corruption and loss of data integrity. To test how devices and components respond under heavy data loads, the application programs 116 may include a test tool suite 118. The test tool suite 118 may include a set of test utilities 120, each configured to generate a heavy data load on a data connection between the processor 102 and a target device. In general, the test utilities 120 generate a heavy data load on the data connection by repeatedly writing test data patterns to and reading data patterns from the target device at or near a maximum bandwidth of the target device or the data connection. To test for data corruptions, the test utilities 120 compare data patterns read from the target device to the test data patterns written. A mismatch indicates a data corruption.

In general, the test utilities 120 generate the heavy data load on the data connection by accessing a range of storage locations on the target device. To facilitate the following description, any range of storage locations on the target device accessed by the test utilities 120 may be referred to as a file. Therefore, as used herein, the term file may refer to a data file accessed via a file server on the target device, a range of storage locations accessed through a logical partition (i.e. logical storage), or a range of storage locations accessed through direct addressing (i.e., physical storage) or a range of locations in memory accessed through direct accessing (i.e., physical memory such as RAM.) I/O access to the range of storage locations may be sequential or random. For example, the test utilities 120 may write to and/or read from a file sequentially in increments of the I/O block size up to the end of file or the end of the specified range. Alternatively, the test utilities 120 may write to and/or read from a file randomly, wherein the storage location that will be accessed is determined by an algorithm which returns a valid offset in the file that is not in conflict with another pending I/O to the same offset. For some embodiments, the test utilities 120 may be configurable to access a file via a file server, logical storage or physical storage based on a user-specified parameter.

The test utilities 120 may target any device the operating system 112 can access (i.e. return a handle or pointer to) that is capable of storing test data patterns written to the device by the test utilities 120. The target device may be local or external to the computer system 100. Examples of local target devices include the storage device 106 (i.e., an IDE or SCSI hard drive) the memory 110,, or any other suitable type devices. External devices include any type of device that may be directly connected to the computer system 100. The external connection may be any suitable connection, such as a SCSI connection (i.e., to the external storage device 130), an IDE connection, a serial or parallel connection, a USB connection, firewire connection, a direct Fibre Channel connection, or an appropriate proprietary connection. Examples of external devices include, external SCSI disk drives, redundant arrays of independent disks (RAIDs), and any other suitable external storage devices.

The test utilities 120 may also target remote devices, including any type of device attached to the computer system through a network connection. For example, one of the test utilities 120 may be configured to validate data transmitted to and from a remote storage device 142 on a server 140 attached to the computer system 100 by the network connection 150. The server 140 may be a network file server, a network attached storage (NAS) device, or a storage area network (SAN) device such as a Fibre Channel RAID device. The computer system 100 may interface with the network connection 150 through the NIC 128 while the server may interface with the network connection 150 through a NIC 144. The network connection 150 may be any combination of suitable connection, such as an Ethernet, Token Ring, Wireless, Fibre Channel, iSCSI, or Infiniband connection. Accordingly, the network connection 150 may be a direct NIC to NIC connection or include any suitable combination of network devices, such as a switch 152, a router 155, and/or a hub 156 to connect the NIC 128 to the NIC 144. As used herein, the term network interface card (NIC) generally refers to any device through which a computer system may interface with a network connection, and includes Ethernet or Token Ring NICs, Fibre Channel host bus adapters (HBAs), iSCSI network adapters, and any other type of network interface device presently known or not yet developed.

Figure 2:
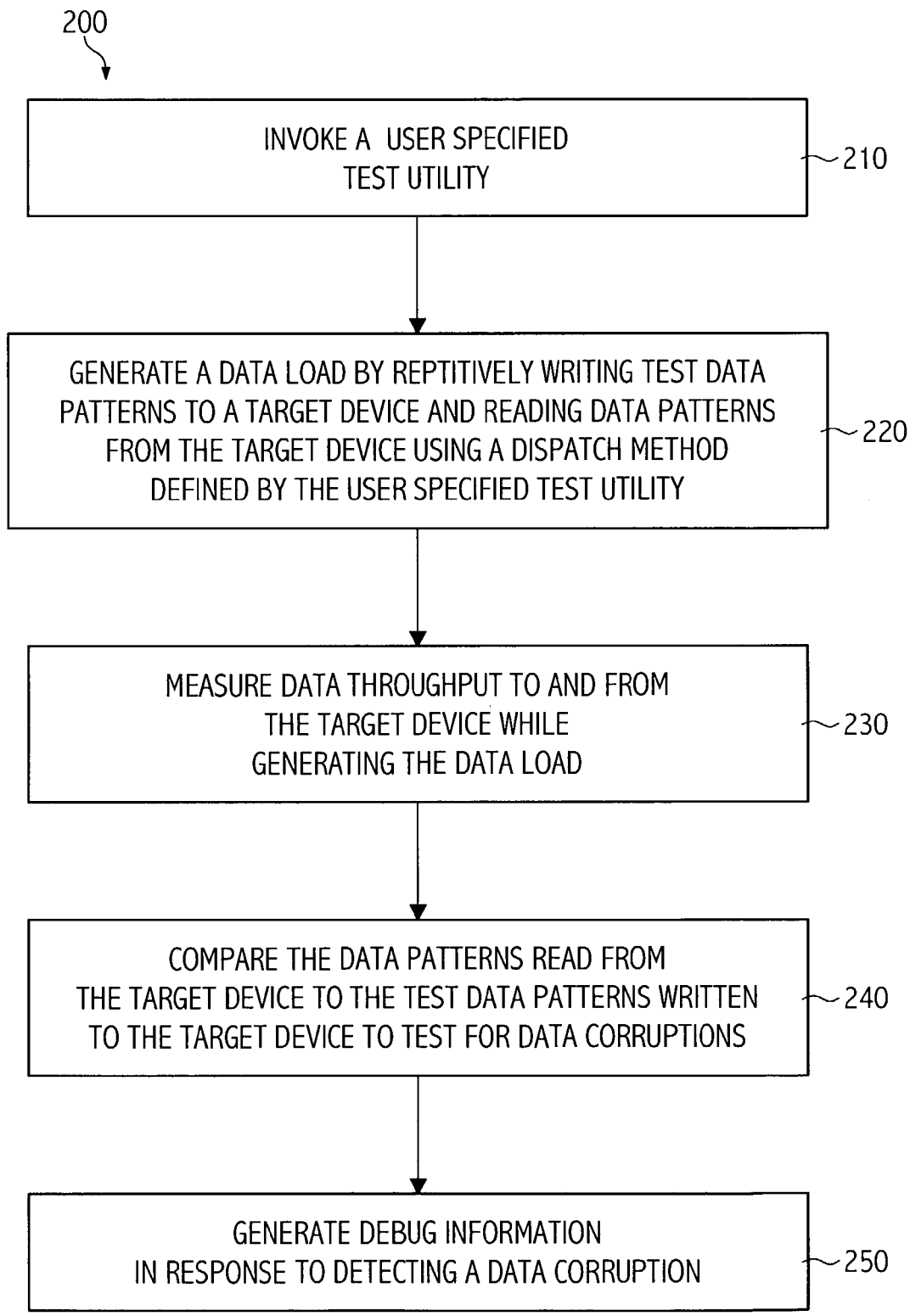
FIG. 2 is a flow diagram illustrating exemplary operations of a method according to one embodiment of the present invention.

General operation of the test utilities 120 may be described with reference to FIG. 2, which is a flow diagram illustrating exemplary operations of a method 200 according to one embodiment of the present invention. The method 200 is initiated at step 210 by invoking a user specified test utility. For example, a user may specify one of the test utilities 120 through a command line or graphical user interface (GUI) of the tool suite 118.

At step 220, the test utility generates a data load by repetitively writing test data patterns to a target device-and reading data patterns from the target device. For example, the test utility 120 may be configured to generate a heavier data load than typically occurs during normal operation by issuing write and read operations that result in data transmitted to and from the target device approaching or exceeding a maximum bandwidth of system components. For some embodiments, data patterns may be read from the target device immediately after a corresponding write operation. For other embodiments, a set of test data patterns (i.e. up to a predetermined file size) may be written to the target device with a number of write operations (i.e. of a given block size for each write operation) prior to reading data patterns from the target device.

At step 230, the test utility 120 measures data throughput to and from the target device while generating the data load. For example, measuring data throughput may include recording the number of write and/or read operations issued to the target device, recording the elapsed time for pending operations, recording the length of time taken to complete the issued operations, and/or calculating an amount of data transferred to and from the target device with the completed operations. The test utility 120 may, for example, periodically display data throughput (i.e. bandwidth) parameters, such as megabytes/second (MB/s) and other performance parameters, such as I/O operations per second (IOPS). Further, the test utility may display the number of file operations (FOPS, i.e. a running total of the number of complete passes where test data patterns are written to and read from an entire file. Further, the test utility may generate a log file of performance statistics for later analysis that includes, but is not limited to, the minimum, average, and maximum MB/s, the total amount of data in megabytes accessed, the minimum, average, and maximum IOPS, the total number of I/Os issued, the number of performance samples taken, and the number of instances of I/O halts (i.e. no data detected during performance sample.)

At step 240, the test utility 120 compares the data patterns read from the target device to the test data patterns written to the target device to test for data corruptions. The test utility 120 may compare data patterns read from the target device to test data patterns after each individual read operation or after a number of read operations. A mismatch indicates a data corruption, which may be caused by a failure of a component within the target device (i.e. with a buffer, controller, cache, etc.) or any device or component in the data path. For example, a data corruption detected by a test utility targeting the local target device may be caused by any hardware or software component or device handling data transmitted between the processor 102 and the local target device. In other words, the data corruption may be caused by the local target device, system bus 108, the operating system 112, a device driver 114 or even the processor 102.

Therefore, at step 250, the test utility 120 generates debug information in response to detecting a data corruption. The debug information may contain information useful in determining the cause of the data corruption. For example, the debug information may include the contents of the test data pattern buffer(s) written to the target device, the contents of the buffer for data read from the target device, the data throughput measured up to a time the data corruption was detected, an address on the target device corresponding to the storage location where the data corruption was detected, and any user-specified operating parameters. The debug information may be displayed on a monitor and/or stored as a file in the storage device 106 for access by the user.

AN EXEMPLARY TEST SYSTEM

Figure 3:
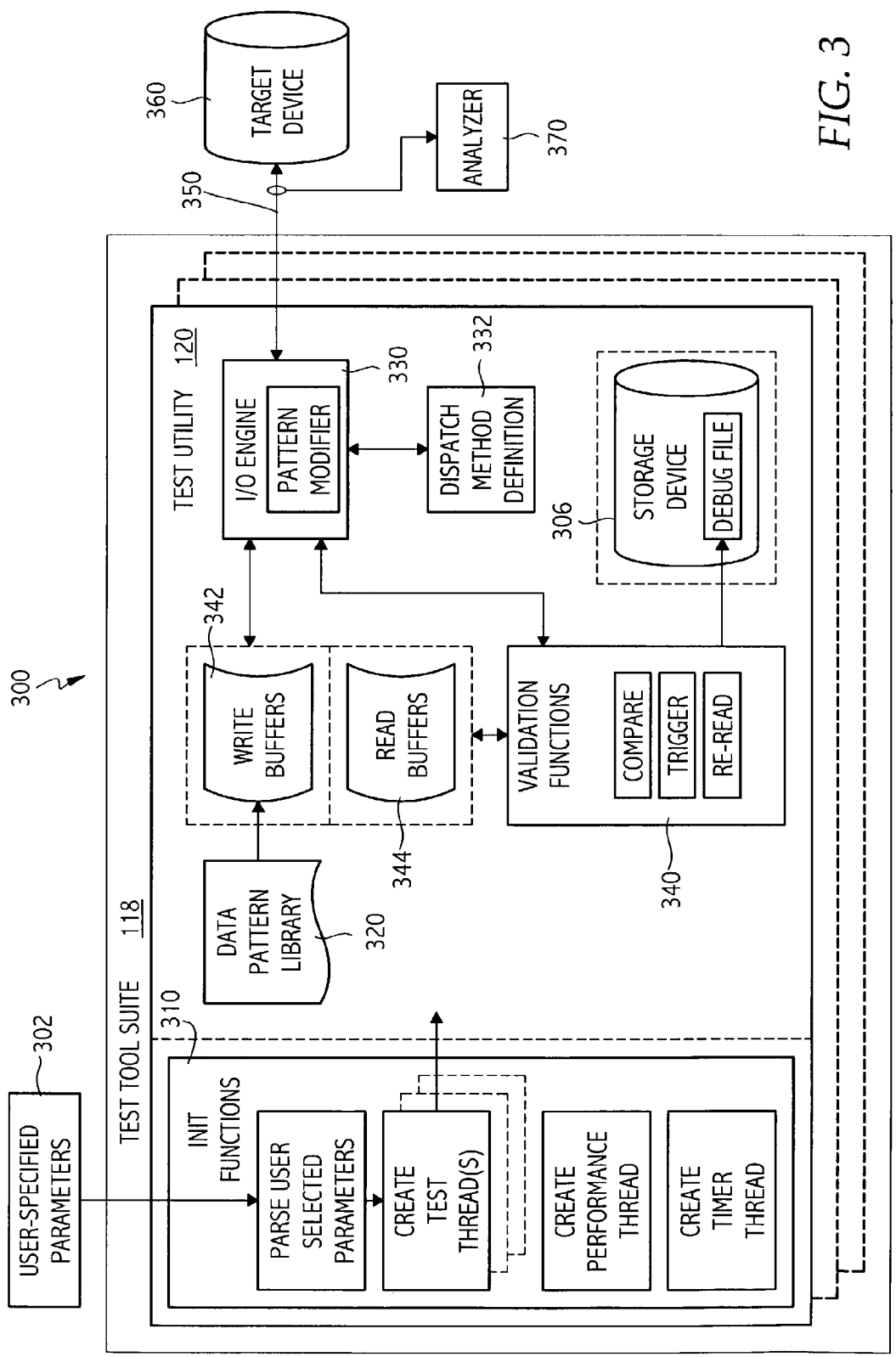
FIG. 3 illustrates an exemplary test system according to one embodiment of the present invention.

FIG. 3 illustrates an exemplary test system 300 utilizing the test tool suite 118 to access a target device 360 with a test utility 120. The test utility 120 accesses the target device 360 through a data connection 350. As previously described, the target device 360 may be local or remote to a computer system running the test utility 120. Accordingly, the data connection 350 may be a local bus or a network data connection. It will be appreciated by those skilled in the art that there are a variety of ways to implement methods in software and that the components of the test utility 120 of FIG. 2 are merely illustrative of one implementation. The components of the test utility 120 include initialization functions 310, a data pattern library 320, an I/O engine 330, dispatch method definition 332, and validation functions 340. The components may be common to each of the test utilities 120 of the test tool suite 118.

The initialization functions 310 parse user-specified parameters 302, and initiate operation of the test tool suite 118 based on the parsed parameters. For example, the user-specified parameters 302 may include which test utility 120 to invoke. Further, the user-specified parameters 302 may also include a number of test threads to create, a block size for I/O operations (i.e. how much data is written to/read a file for each I/O operation), a file size, an offset location for the start of the file, and a parameter to determine whether to access the file via a file system, or via physical or logical addressing. Hence, the test utilities 120 are scalable to test a variety of system sizes and configurations.

Further, the user specified parameters 302 may also include an offset that may be used for a sharing mode in which multiple instances of a test utility may access the same target device. For example, an instance of a test utility may be invoked with a 10 MB memory range and a zero starting offset. A second instance of the test utility may be invoked (on the same or different test machine), with a 10 MB memory range and a 10 MB starting offset. Hence, both instances of the test utility may access the device without write "collisions" (i.e. overwriting each other that may lead to erroneous data corruptions).

The user-specified parameters 302 may also specify a specific set of data patterns from the data pattern library 320 to write to the target device 360. The data pattern library 320 generally includes specific data patterns designed to stress the target device and/or particular components along the data connection 350. In other words, components along the data connection 350 may exhibit significantly different behavior when processing different data patterns. For example, "blinking" data patterns that continuously alternate bits from all '1's to all '0's force hardware logic of the component to alternate between high and low values, thereby testing the ability of the components to assert and deassert signals under maximum stress conditions.

The data pattern library 320 may also include other specific data patterns, such as checkerboard patterns (i.e., 10101, 01010, 10101, etc.) and walking bits patterns (00001, 00010, 06100, etc.). Further, to test that software components, such as device drivers, are able to process all data values correctly, some data patterns may "step" through all possible data values from all '0's to all '1's. The data pattern library may also include data patterns of varying length, for example, to accommodate data paths of differing widths. Exemplary data pattern lengths include 8-bit, 10-bit, 16-bit, 32-bit, and 64-bit. Further, the data pattern library may also include data patterns which produce signal aggravating data traffic when encoded according to a defined encoding scheme. An example would be an 8-bit based pattern that produces data traffic which results in an alternating blinking of bits in a serial signal stream when encoded into a 10-bit signal for transmission over Fibre Channel.

The I/O engine 330 manages the I/O operations for the test utilities 120. For example, the I/O engine 330 loads test data patterns from the data pattern library 320 into write buffers 342 and writes the test data patterns to the target device 360 and reads data patterns from the target device 360 into read buffers 344. The I/O engine may also be instructed to issue write-only or read-only data traffic. The I/O engine performs the I/O operations for writing and reading data patterns according to an I/O dispatch method defined by a dispatch method definition 332 of the test utility 120 currently running.

As used herein, I/O dispatch method refers to a method for dispatching I/O operations from a test system running the test utility 120 to the target device 360 over the data connection 350. I/O dispatch method refers to the I/O method used for I/O function calls, such as asynchronous dispatch methods, synchronous dispatch methods, and scatter-gather dispatch methods. Further, I/O dispatch method also refers to protocol specific I/O operations using specific network protocols, such as connectionless protocols, such as UDP, or connection-oriented protocols, such as TCP. By using different dispatch methods, the set of test utilities 120 may be optimized to test different types of devices and components.

I/O operations may be performed using any suitable type function calls. For example, I/O operations may be performed using common C or C++ library calls, such as fwrite or fread, or operating system application program interface (API) calls, such as Windows NT® writefile or readfile. The test utilities 120 may also be implemented using any suitable programming language other than C or C++, such as Java® or VisualBasic® programming languages. Further, I/O operations may be performed using any suitable storage protocol commands, such as SCSI command data blocks (CDBs), or any suitable network protocol commands, such as TCP/IP socket commands, or any other suitable type method for issuing I/O operations.

Validation functions 340 include functions to compare the data patterns read from the target device 360 to the test data patterns written to the target device 360 to test for data corruptions, for example, by comparing write buffers 342 to read buffers 344. The validation functions may also include functions to trigger an analyzer to capture data transmitted on the data connection. The validation functions may also include functions to re-read data patterns from the target device 360 and generate debug information in response to detecting a data corruption. As illustrated, debug information may be stored as a debug file in a storage device 306, such as a hard drive.

FIG. 4 is a flow diagram illustrating exemplary operations of a method 400 according to one embodiment of the present invention that may be implemented by the components illustrated in FIG. 3. However, it should be noted that the operations of method 400 may be implemented by components other than those illustrated in FIG. 3. Further, the components illustrated in FIG. 3 are not limited to the exemplary operations of FIG. 4.

The method 400 begins at step 410, by invoking a user specified test utility. For example, as previously described, the user-specified parameters 302 may specify one of the test utilities, which each define a I/O dispatch method. For some embodiments, the user-specified operating parameters 302 may be entered through a graphical user interface (GUI). However, because a GUI may consume system resources that may be used in the I/O operations for generating the data load, user-specified operating parameters 302 may be entered as command-line arguments for other embodiments. Such embodiments may bypass a graphical operating system in a further effort to maximize a data load. For example, the test utilities 120 may be invoked from a DOS command line rather than a Windows® interface.

At step 420, the I/O engine 330 loads a write buffer 342 with test data patterns. At step 430, the I/O engine 330 generates a data load on the data connection 350 by repetitively writing test data patterns from the write buffer 342 to the target device 360 and reading data patterns from the target device 360 into the read buffer 344 using the user-specified dispatch method. For different test utilities 120, a number of write buffers 342 and read buffers 344 may vary. The I/O engine may rapidly alternate between writing test data patterns and reading data patterns, or may write an entire set of test data patterns prior to reading any data patterns.

For example, as previously described, the user-specified parameters 302 may specify an I/O block size and a file size. The I/O engine 330 may repetitively write blocks of test data patterns, of the user-specified I/O block size, up to the user-specified file size.

At step 435, data throughput to and from the target device 360 is measured while generating the data load. For example, data throughput (bandwidth) may be measured by a performance thread created by the initialization functions 310. The performance thread may measure an amount of data written to and received from the target device 360 for all I/O operations over a fixed period. The performance thread may also measure a total number of I/O operations over the fixed period. The performance data may be logged to a file and/or periodically displayed on a screen, for example, every 5 seconds. As previously described, data throughput is typically displayed as mega-bytes per second (MB/s), while I/O operations are typically displayed as I/O operations per second (IOPS) and completed passes through a file are displayed as file operations (FOPS). As previously described, performance data may be logged to a file on a local storage device for later analysis. For other embodiments, performance data, such as data throughput may not be monitored, or monitoring of performance may be disabled by a user specified parameter.

At step 440, the test utility 120 compares the data patterns read from the target device to the test data patterns to test for data corruptions. For example, validation functions 340 may compare the write buffers 342 to the read buffers 344. The comparison may be performed after each block of data patterns is read from the target device 360, or after a number of reads have completed, or after the entire file is read. Regardless, because the comparisons are performed using data patterns stored in memory (i.e. the buffers), the comparisons may be performed in a speed efficient manner, allowing the test utility 120 to maintain the heavy data load.

At step 450, if a data corruption is detected, the test utility 120 may generate a debug file with debug information at step 460. The debug information may also be displayed on a screen. Regardless, the debug information may contain, for example, an address of any storage location of the target device 360 from which corrupt data was read, the block of data patterns read from the target device (i.e., a read buffer 344) containing the corrupt data, the corresponding block of test data patterns (i.e., a write buffer 342), and a list of the user-specified parameters. This debug information may be useful in diagnosing a source of the data corruption. For example, if a block of data equal in size to a buffer of the target device 360 is corrupt, a device driver may have incorrectly handled an address pointer. Alternatively, if the corrupt data patterns read from the target device 360 and the test data patterns differ by only a specific bit, a faulty bus line may be the cause.

At step 470, the I/O engine re-reads data patterns from the storage location on the target device corresponding to the data corruption. An advantage to performing this re-read is that additional debug information is generated that may be useful in diagnosing a source of data corruption. For example, the same corrupt data patterns read initially and on re-read indicates corrupt data was committed to the target device. On the other hand, a match between data patterns from the re-read and the test data patterns indicates the corrupt data was not committed to the target device, indicating a component in the data path to the target device or cache memory in the target device may be the problem.

At step 480, the test utility 120 compares data re-read from the target device 360 to the corresponding test data patterns and stores the results of the comparison in the debug file. Alternatively, the data re-read from the target device 360 may be compared to the data patterns initially read that resulted in the data corruption. Of importance is determining whether the data patterns re-read from the target device match the data patterns from the initial read. Further, the data patterns re-read from the target device may be stored in the debug file without performing a comparison, for example, leaving a comparison up to a user.

At step 490, an analyzer 370 may be triggered. Troubleshooting a data corruption on a bus may be facilitated with the use of an analyzer that can monitor and capture data transmissions on one or more components of the data connection 350. The captured data can be analyzed to find transmission irregularities that might further assist in identifying a source of the data corruption. For example, the analyzer may indicate that data arrives at the analyzer correctly, and is, therefore, corrupted after the analyzer. For some embodiments, it may be preferable to trigger the analyzer 370 immediately after detecting a data corruption (i.e. before generating the debug file and/or re-reading data patterns from the target device), in an effort to capture data transmissions as early as possible.

The analyzer 370 may be attached at any point along the data connection, and the type of analyzer used may depend on the type of data connection. As an example, if the data connection 350 is a Fibre Channel data connection, the analyzer may be a Fibre Channel analyzer, such as the GT series of analyzers available from Finisar Corporation of Sunnyvale, Calif. Other types of analyzers include, but are not limited to, PCI bus analyzers, SCSI bus analyzers, Ethernet analyzers, and logic analyzers. An exact location of attachment may depend on the type of analyzer and the type of bus. The analyzer 370 may be configured to trigger on a predetermined triggering data pattern. The test utility 320 may trigger the analyzer upon detecting a data corruption by writing the triggering data pattern to the target device. The analyzer detects the triggering data pattern transmitted on the data connection and begins to capture data.

The analyzer 370 may be especially useful in determining data corruptions caused by network devices, such as hubs, routers, or switches. Because lower level network protocols may detect and fix such data corruptions with retransmissions, the test utility 120 may not directly detect such data corruptions. However, these retransmissions may degrade network bandwidth.

Figure 4A:
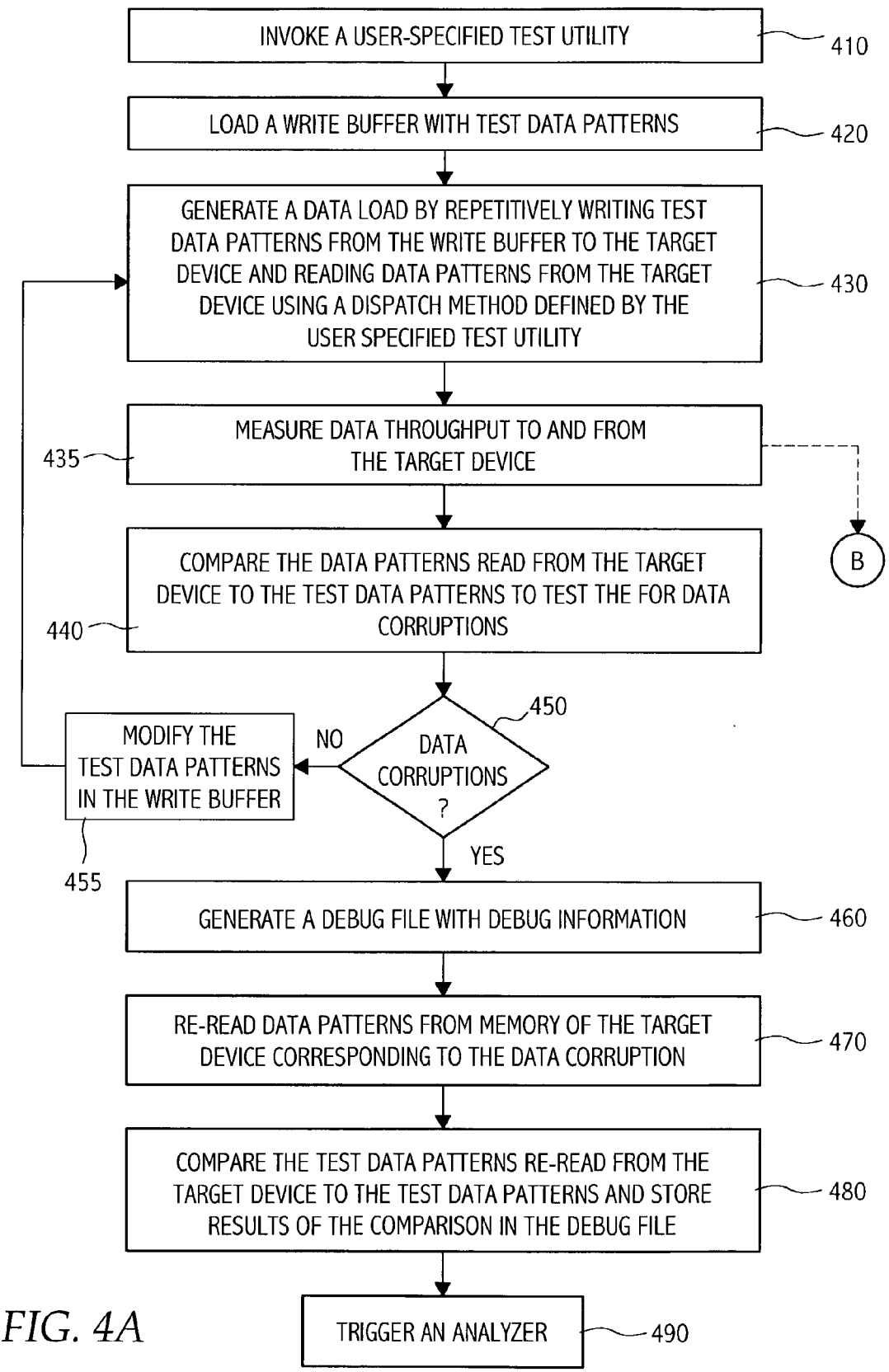
FIGS. 4A and 4B illustrate exemplary operations of a method according to another embodiment of the present invention.
Figure 4B:
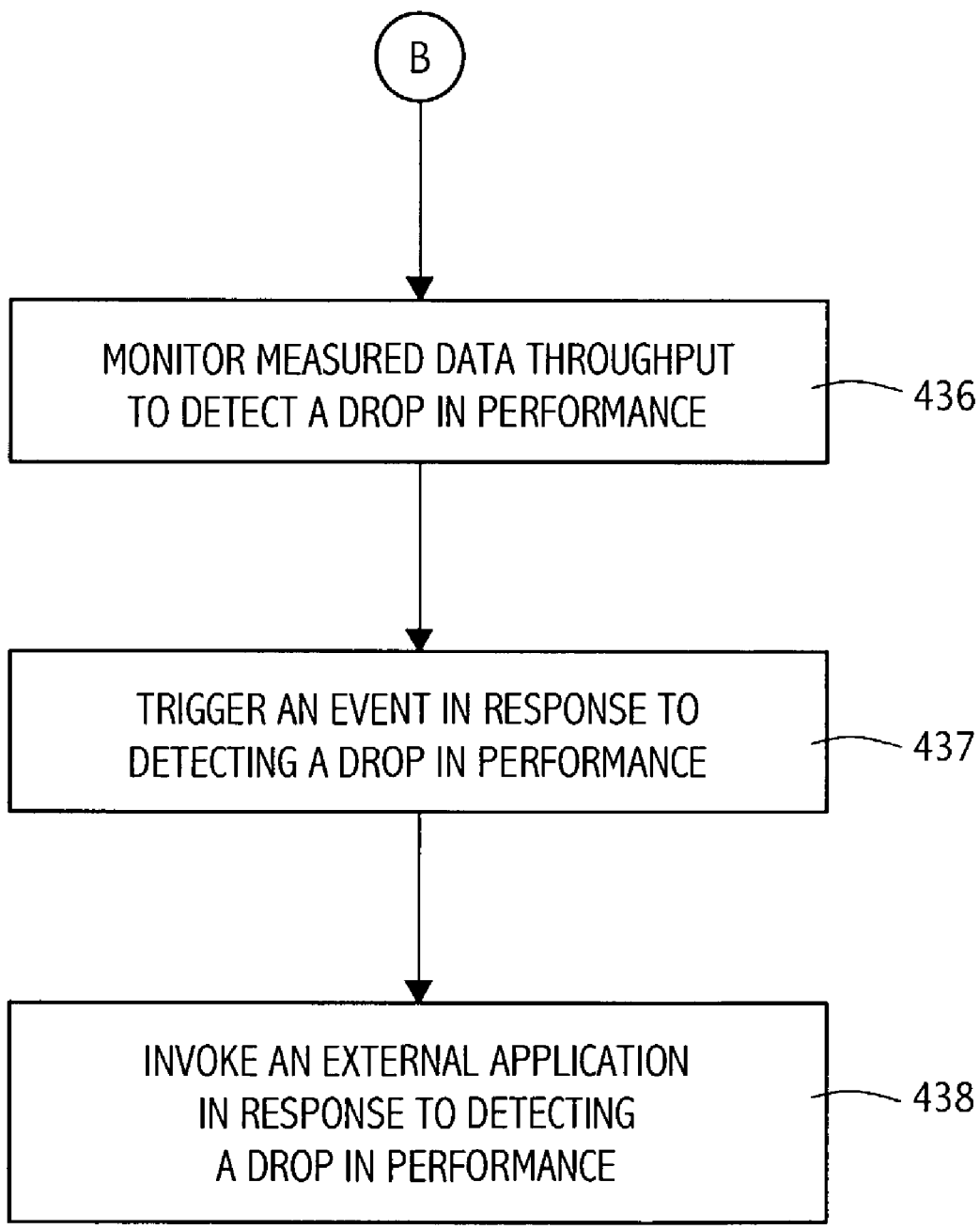

Therefore, as illustrated in FIG. 4B, for some embodiments, the test utility 120 may be configured to monitor measured data throughput to detect a drop in performance at step 436. For example, the test utility 120 may compare a measured bandwidth to an average bandwidth or a predetermined bandwidth value. In response to detecting a drop in performance, an event may be triggered at step 437. For some embodiments, triggering an event may include triggering the analyzer 370. However, f in other embodiments, other types of events may be triggered in response to detecting a data corruption. For example, the test utility may dispatch a network message, such as a simple network management protocol (SNMP) trap message to notify network management software that a performance anomaly has been detected.

Further, for some embodiments, additional diagnostic information may be collected by accessing the target device with a separate application. Therefore, for some embodiments, the test utility 120 may invoke a separate application at step 438. For example, the separate application may access the target device in a manner designed to cause the target device to dump a content of storage locations, which may provide additional debugging information. For some embodiments, a test utility may be configured to perform the operations of FIG. 4B without performing data validation. For example, a data load may be generated by writing test data patterns to a target device and/or reading data patterns from the target device while measuring data throughput without performing data validation.

Referring back to FIG. 4A, if a data corruption is not detected at step 450, the I/O engine 330 at step 455 may modify the data patterns in the write buffer 342, which may allow the test utility 120 to detect data corruptions that might not be detected otherwise. For example, potential data corruptions may not be detected if the same data pattern is written to a storage location on successive write passes. For example, the target device may be susceptible to bits being stuck in a high or low state in certain storage locations or across certain lines on a bus. This condition may not be detectable if the same data is written over and over.

To avoid these erroneous data validations, the I/O engine 330 may dynamically modify the test data patterns in the write buffer, with a pattern modification routine, to ensure that test data patterns written to any given storage location are changed each pass. One simple way to ensure that the test data patterns are changed each pass is to reversing the data pattern values on successive passes. This may be accomplished by utilizing a forward write buffer and a backward write buffer. The I/O engine may alternate between the forward and backward write buffers on successive passes.

Other problems may occur if the same data pattern is written to each storage location for a given pass. For example, when reading data patterns from the storage locations after writing test data patterns, data may actually be read from a different storage location, for example, due to a driver problem. If the test data pattern written to the different storage location is the same as that written to the intended storage location, an erroneous match will occur during the validation process. Therefore, for some embodiments, the I/O engine 330 modifies each test data pattern to ensure that a unique block of data is written to each storage location. Any suitable technique may be utilized to ensure unique data is written to each location. For example, a signature including the currently accessed address of a target storage location may be embedded into each data pattern. Thus, the test data patterns may be unique with respect to each other. Signatures may also aid in identifying a corrupted I/O in a trace captured by an analyzer.

As illustrated, if no data corruptions are detected, the steps 430 through 455 may be repeated in an effort to maintain a data load on the test system, for example, until a user intervenes and terminates the test utility 120. Further, the test utility 120 may terminate after a user specified number of passes through the file has occurred, or a user-specified test period has elapsed as indicated by a timer thread. Other methods of termination may include termination after a predetermined or user specified number of data corruptions has been detected.

TEST UTILITY OPTIMIZATIONS

As previously described, devices are more likely to fail when subjected to high I/O stress. Devices along a data path between a test system and a target device are subjected to high I/O stress as test utilities generate a heavy data load by repetitively accessing the target device with I/O operations. This repetitive access may result in a greater number of I/O operations per second than occurs during normal operation, as the test utilities are configured to dispatch the I/O operations in a manner that approaches or exceeds a maximum bandwidth of system components. Test utilities may be optimized to generate high I/O stress on specific system devices and components by varying parameters, such as the type of device targeted, the type of I/O dispatch methods, the type of data connection, and a number of pending I/O operations.

For example, by targeting a local device, such as a hard drive, a test utility may generate a high I/O stress on local system components, such as local buses, processors, and device drivers. A test utility may be configured to maintain a large number of pending I/O operations to place additional I/O stress on the local system components. For example, with a large number of pending I/O operations (each accessing a large amount of data), the operating system may have to manage a large amount of virtual memory. Test utilities may be configured to maintain a number of pending I/O operations as appropriate for the local system or intended target device, for example, by using asynchronous dispatch methods or by creating multiple test threads using synchronous dispatch methods.

Test utilities may also be optimized to generate a high I/O stress on network components. For example, a test utility may be configured to generate a heavy data load on a network connection by repetitively writing to and reading from a remote target device on a server connected to a test system through a network connection. For some embodiments, the test system may include one or more test clients, each running a test utility configured to "saturate" the network connection with I/O traffic near or above a maximum bandwidth. For some embodiments, each test utility may create multiple test threads to simulate a number of clients accessing the server, which may place an additional I/O stress on the server as the server attempts to service each test thread.

Further, as previously described, the test utilities may be configured to access storage locations on the target device as a data file via a file system, as physical storage, or as logical storage. In some cases, a test utility may be configured to access multiple data files on a target device in order to test a file system. For other cases, a test utility may be configured to bypass the file system (and associated system overhead) to access physical storage in an effort to increase the data load. Further, a test utility may be configured to access logical storage to test the capability of a device, device driver, or operating system, to translate to physical memory addresses from virtual logical addresses.

The following exemplary test systems illustrate some of these different optimization techniques. The test utilities of the following examples may utilize the same methods and components previously described. For example, the test utilities may use the common I/O engine previously described and the same validation functions. Each of the following test utilities may measure the performance of data throughput to and from the target device. User specified parameters for each of the following test utilities may include a parameter to specify a set of test data patterns to use for generating a data load and how or if to modify the test data patterns dynamically. However, in order to facilitate discussion of the optimization techniques, some of these details are omitted from the following examples.

For different embodiments, any or all of the test utilities of the following examples may be included, in any combination, in the suite of testing tools previously described. Alternatively, any of the test utilities of the following examples may function independently, for example, as stand alone program products.

EXAMPLE 1

Scalable Asynchronous I/O Testing Tool

When an application program issues an asynchronous I/O operation, program control is returned to the application program, even though the I/O operation has not completed. This enables a time-consuming I/O operation to be executed in the background while a calling thread of the application program is free to perform other tasks. For example, the calling thread may issue additional asynchronous I/O operations. Accordingly, a single thread may generate a number of pending I/O operations.

Figure 5:
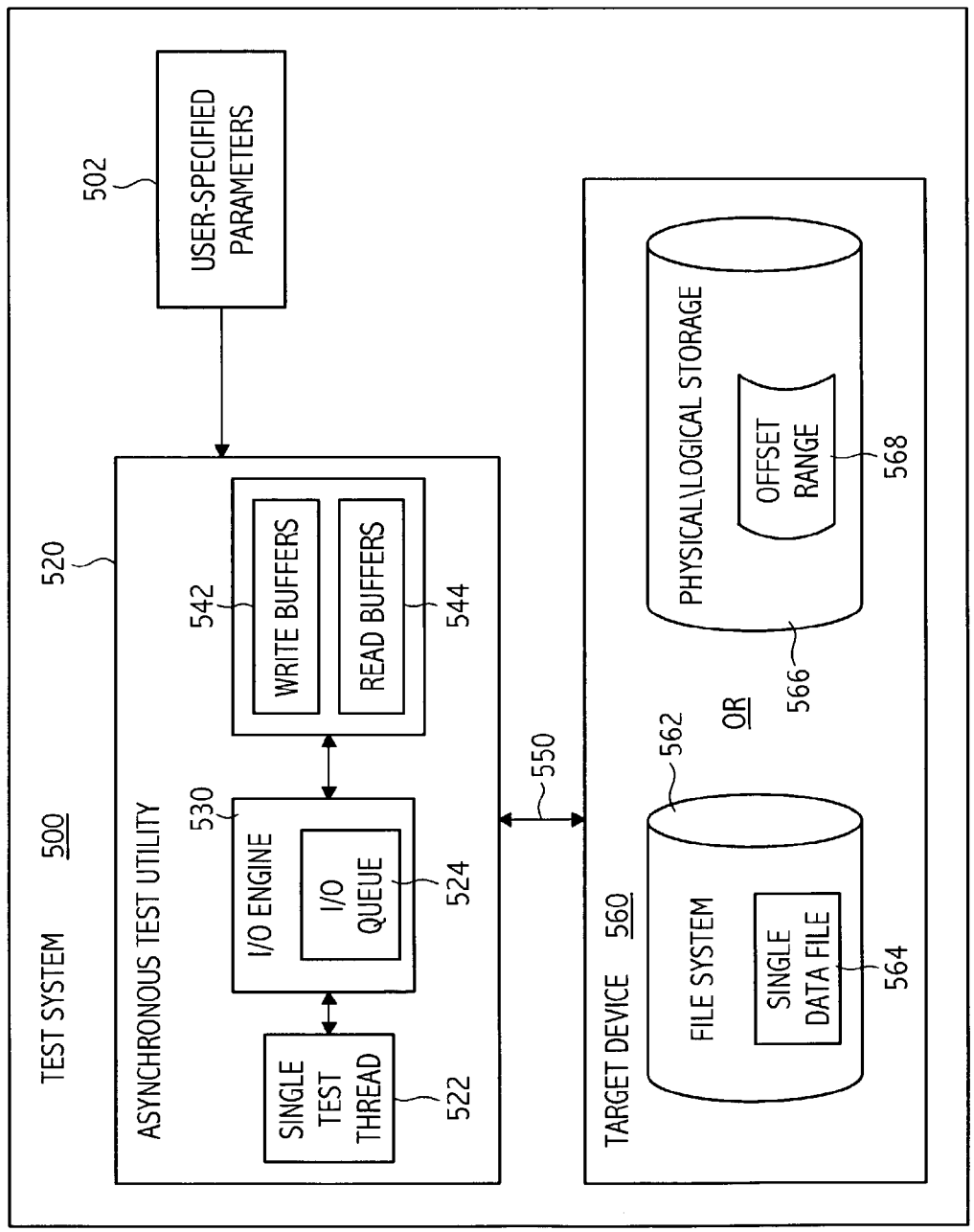
FIG. 5 illustrates one embodiment of a system for testing data validity under data loads generated with asynchronous I/O operations.

FIG. 5 illustrates a test system 500 utilizing a test utility 520 to validate data transmitted to and from a target device 560 via a data connection 550. The test utility 520 creates a single test thread 522 to generate a data load on the data connection 550 by repetitively writing test data patterns to the target device 560 and reading data patterns from the target device 560 using an asynchronous I/O dispatch method. The test thread 522 compares the data patterns read from the target device 560 to the test data patterns to test for data corruptions and generates debug information in response to detecting a data corruption.

The I/O operations may be dispatched using any suitable asynchronous dispatch method. An exact implementation may be determined by an operating system on which the test utility 520 is running. For example, under Windows NT or Windows 2000, asynchronous procedure calls (APCs) may be utilized.

The target device 560 may be a local or external storage device, such as a hard drive, a SCSI device, or a redundant array of independent disks (RAID). Accordingly, the data connection 550 may be any suitable local bus connection, such as a system bus, PCI bus, or ISA bus, or an suitable external connection, such as a SCSI connection or Fibre channel connection. As illustrated, the test utility 520 may access a file in the form of a single data file 564 of file system 562 or an offset range 568 of physical or logical storage 566 of the target device 560. User-specified parameters 502 may include a parameter that specifies a device access type. For example, a user may specify that the file is accessed sequentially, with writes issued to the file up to the end of the file or offset, followed by reads on the next complete pass through the file. Alternatively, the user may specify that access to the file will occur in a random manner, wherein a write operation is issued to a random valid location in the file that is not in contention with another pending I/O and a read of the location is performed immediately after the write operation is complete.

Figure 6:
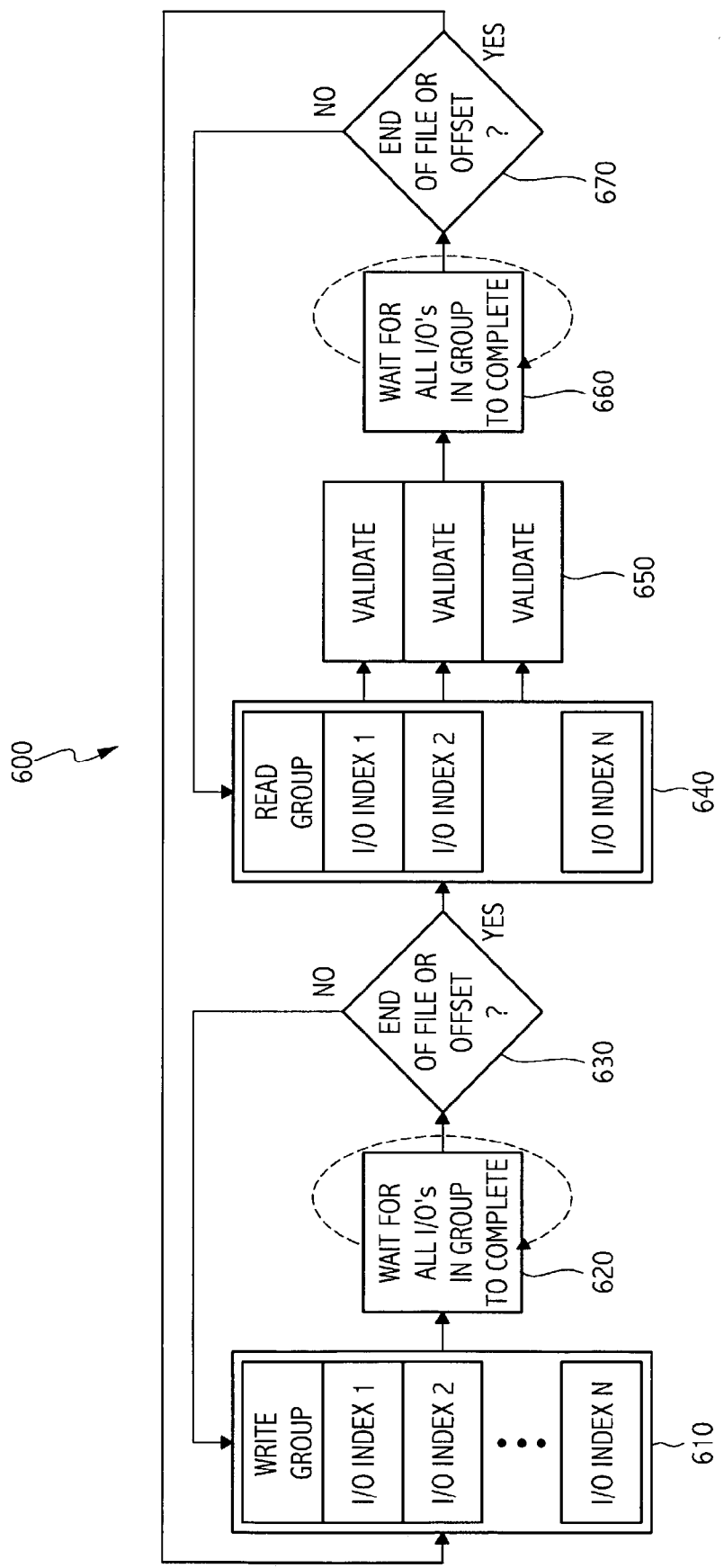
FIG. 6 is a flow diagram illustrating exemplary operations of a method for testing data validity under data loads generated with asynchronous I/O operations.
Figure 7:
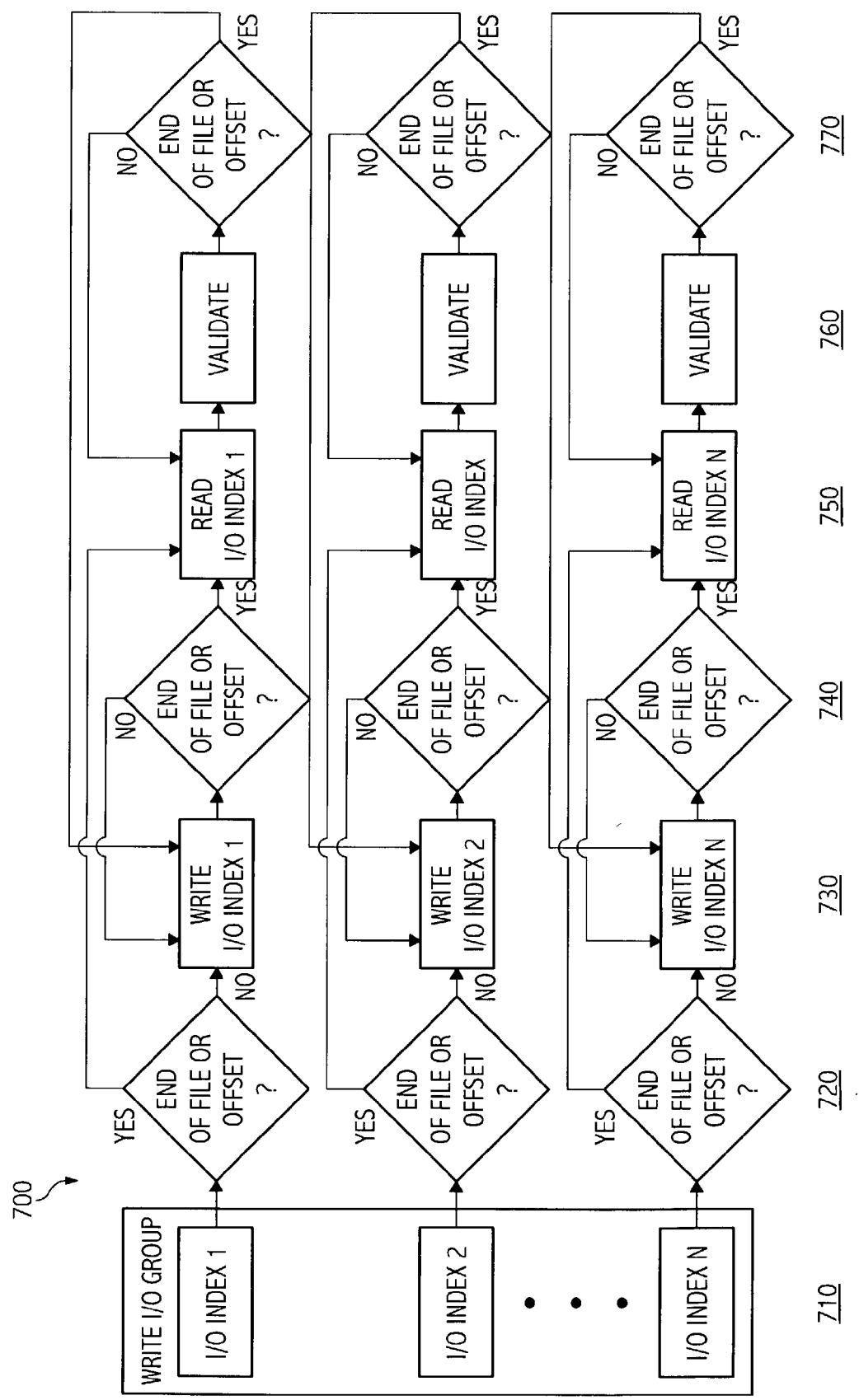
FIG. 7 is a flow diagram illustrating exemplary operations of another method for testing data validity under data loads generated with asynchronous I/O operations.

The user-specified parameters 502 may also include a queue depth parameter that determines how many pending I/O operations are allowed in an I/O queue 524 (i.e. how deep the queue is allowed to be). The queue depth parameter may also determine a size of write buffers 542 and read buffers 544. For example, as previously described, the user-specified parameters 502 also specify an I/O block size. Each I/O operation has an index into the file on the target device. The user-specified parameters 502 may also include a queue dispatch parameter 508 that determines whether the number of pending I/Os in the I/O queue 524 is fluctuating or constant. FIGS. 6 and 7 are flow diagrams illustrating exemplary operations of methods 600 and 700 utilizing a fluctuating I/O queue and a static I/O queue, respectively. Both FIGS. 6 and 7 assume a user-specified queue depth of N, which may be any allowable queue depth. For example, a user may set N to a large number to test how a system or target device handles a large number of pending I/Os.

Method 600 begins at step 610, by issuing a group of N write operations, each writing a block of test data patterns to corresponding blocks of memory on the target device 560. Hence, N I/Os are pending immediately after the group of write operations is dispatched. At step 620, the test thread 522 waits for all the write operations in the group to complete. Thus, as the individual write operations complete, the number of pending write operations is reduced (from N to zero, when the last write operation is complete). As each write operation completes, the test thread de-queues the completed operation, so that a depth of the I/O queue 524 is fluctuating. At step 630, if the end-of-file (file system access) or end of range (physical/logical access) is not reached, more blocks of test data patterns are written to the target device at steps 610 and 620.

If the end-of-file or end of range is reached, a group of read operations is issued at step 640. As each read operation completes, the data patterns read from the target device are validated (i.e., compared to the test data patterns) at step 650 to test for data corruptions. At step 660, the test thread 522 waits for all the read operations in the group to complete. Thus, as the individual read operations complete, the number of pending read operations will be reduced from N to zero (when the last read operation is complete). It should be noted that, while not illustrated, the validation operations of step 650 may include any of the operations described above, such as triggering an analyzer, generating a debug file and re-reading data from the target device.

At step 670, if the end-of-file or end of range is not reached, steps 640 through 660 are repeated. Otherwise, the write and read operations of steps 610 through 670 are repeated, maintaining the heavy data load. As previously described, the test data patterns in the write buffer may be modified prior to repeating the write operations. It should also be noted that the comparison operations of step 650 may alternatively be performed after all the read operations are complete.

Referring now to FIG. 7, exemplary operations of a method 700 utilizing a static I/O queue depth will be described. At step 710, a group of N write operations is issued and hence, N write operations are pending. However, rather than wait for the entire group of write operations to complete, as soon as an individual write operation is complete, a new write operation is issued at step 730, effectively replacing the completed write operation. Thus, the number of pending write operations is maintained at N, which may help maintain a heavy data load on the system. Similarly, as soon as an individual write operation of step 730 is complete, if the end-of-file or end of range is not reached at step 740, a new write operation is again issued at step 730 to replace the completed write operation.

Once the end-of-file or end-of-range is reached at step 740 (or step 720), individual read operations are issued at step 750. Hence, even as the number of pending write operations is decreasing from N, the total number of pending I/O operations is maintained at N by the read operations issued at step 750. As each individual read operation completes, the data patterns read from the target device may be compared to the test data patterns at step 760. At step 770, if the end-of-file (file system access) or end of range (physical/ logical access) is not reached, steps 750 through 770 are repeated. Otherwise, steps 730 through 770 are repeated, maintaining the heavy data load.

By generating and maintaining a number of pending I/O operations, the test system 500 may be useful in testing storage devices, such as local or external hard drives, a redundant array of independent disks (RAID) and/or any device in the data path between the test utility and the target device. The number of pending I/O operations may be specified by a user, as well as whether the I/O queue maintains the number of pending I/O operations as static. Because the method 700 (which maintains a static number of pending I/O operations) does not have the wait operations of steps 620 and 660 of the method 600, a static number of pending I/O operations, and the associated data load, may be greater than that generated using the method 600.

EXAMPLE 2

Scalable Scatter/Gather I/O Testing Tool

Scatter/gather I/O routines are useful for systems with heavy disk I/O usage where multiple page-sized buffers are copied between a storage device and memory. Gather (write) operations take pointers to the buffers, "gather" data from the buffers together, and write them out to a single contiguous area of the file. Scatter (read) operations read in one or more pages of data from the storage device, and "scatter" them to specified buffers set up beforehand. An advantage to the scatter/gather dispatch method is that, rather than performing a large number of individual I/O operations for each buffer, a single scatter/gather operation may be performed.

Because of this advantage, it is desirable for devices to support scatter/gather I/O operations. For example, device manufacturers may design their products to support scatter/ gather I/O operations in an effort to facilitate program interaction with their product and gain a wider acceptance. Further, some devices may also have direct memory access (DMA) controllers that support scatter/gather I/O. Device drivers for these devices should be capable of supporting scatter/gather I/O.

Figure 8:
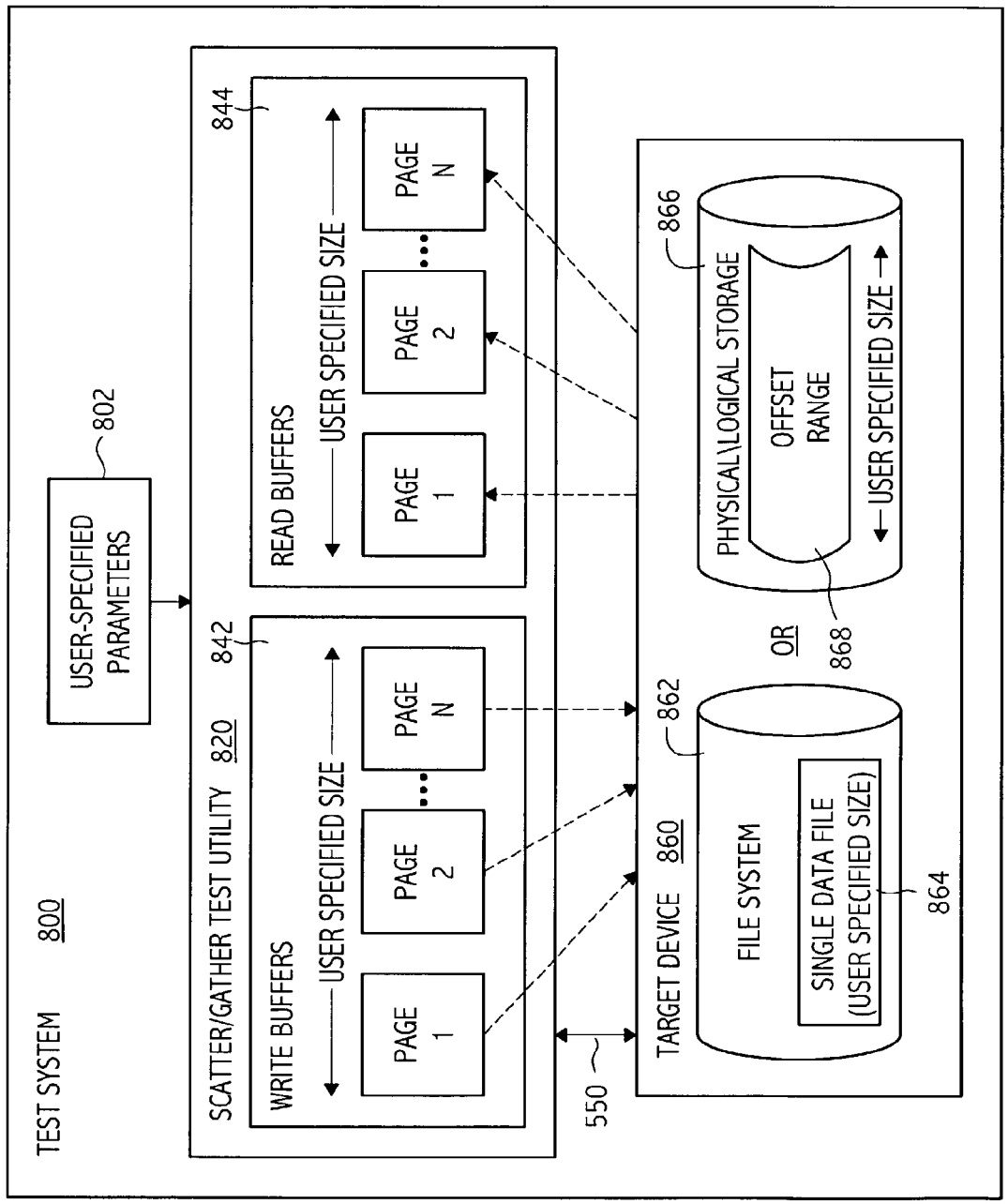
FIG. 8 illustrates one embodiment of a system for testing data validity under data loads generated with scatter/gather I/O operations.

A test utility using a scatter/gather I/O dispatch method may be optimized to test operating systems, devices and device drivers that support scatter/gather I/O operations. FIG. 8 illustrates a test system 800 utilizing a scatter/gather test utility 820 to validate data transmitted to and from a local target device 860 via a data connection 850. The test utility 820 generates a data load on the data connection 850 by writing test data patterns to the target device 860 and reading data patterns from the target device 860 using a scatter/gather dispatch method. The test utility 820 compares the data patterns read from the target device 860 to the test data patterns to test for data corruptions.

The target device 860 may be a local or external storage device, such as a hard drive, a SCSI device, or a redundant array of independent disks (RAID). Accordingly, the data connection 850 may be any suitable local bus connection, such as a system bus, PCI bus, or ISA bus, or a suitable external connection, such as a SCSI connection or Fibre channel connection. As illustrated, the test utility 820 may access a file in the form of single data file 864 of file system 862 or an offset range 868 of physical or logical storage 866 of the target device 860. User-specified parameters 802 may include a parameter that specifies a device access type.

The user-specified parameters 802 may include a file size (or range of storage locations) to access and an I/O block size, which will determine the number N of pages in the write buffers 842 and read buffers 844. For example, each buffer will be equal in size to the I/O block size, which must be a multiple of the test system memory page size, (i.e., 4 kb, 8 kb, etc). The user-specified parameters 802 may also include a parameter that specifies whether the test utility 820 accesses storage locations of the target device 860 as a file on a file system 862 or a as an offset range of physical\logical memory on storage device 866.

Figure 9:
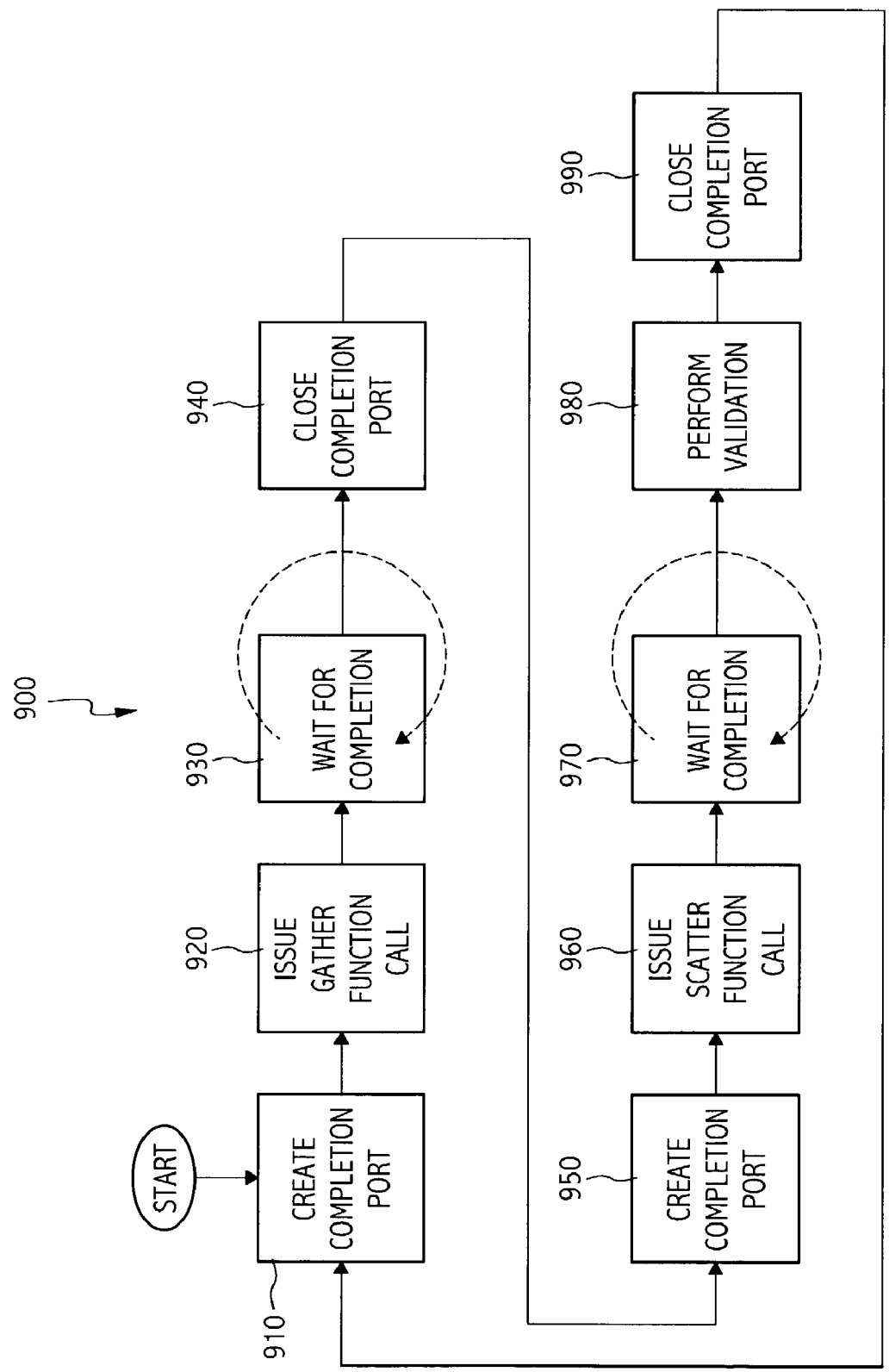
FIG. 9 is a flow diagram illustrating exemplary operations of a method for testing data validity under data loads generated with scatter/gather I/O operations.

FIG. 9 illustrates exemplary operations of a method 900 for generating a heavy data load utilizing a scatter/gather I/O dispatch method. Any suitable scatter/gather functions may be used and the exact functions may be determined by an operating system used. For example, WriteFileGather and ReadFileScatter API functions may be used with Windows 2000® or Windows NT® operating systems.

At step 910, a completion port is created for a gather (write) function call. The completion port provides a notification mechanism for the test utility 820 to determine if the gather function is complete. At step 920, the test utility 820 issues the gather function call. For example, the test utility 820 may load write buffers 842 with a user specified set of test data patterns. The test utility 820 may pass the gather function a list of pointers to the write buffers 842, and specify a single data file 864 as a destination. The gather function gathers the test data patterns from the write buffers 842 and writes the test data patterns to the target device 860.

At step 930, the test utility 820 waits for completion of the gather function. For example, a worker thread of the test utility 820 waits on the completion port for notification that the gather function is complete. At step 940, once notification is received that the gather function is complete, the completion port is closed.

At step 950, a completion port is created for a scatter (read) function. At step 960, the scatter (read) function is dispatched. For example, the test utility 820 may pass the scatter function a list of pointers to the read buffers 844, and specify the data file 864 as a source. The scatter function takes the data (i.e. data patterns) from the data file 864 and scatters them to the read buffers 844.

At step 970, the test system waits for the completion port for notification the scatter function is complete. At step 980, the test utility 820 performs validation functions, for example, by comparing the data patterns read from the target device 860 with the scatter function to the test data patterns written to the target device 860 to test for a data corruption, as previously described. While not illustrated, the validation operations of step 980 may include any of the operations described above, such as triggering an analyzer, generating a debug file and re-reading data from the target device in response to detecting a data corruption.

At step 990, the completion port is closed. Alternatively, the completion port may be closed prior to performing the validation at step 980. If no data corruptions are detected at step 980, the steps 910 through 990 may be repeated, as determined by the user specified parameters 802. As previously described, the test data patterns in the write buffers 842 may be modified prior to repeating the steps 910 through 990.

Figure 10:
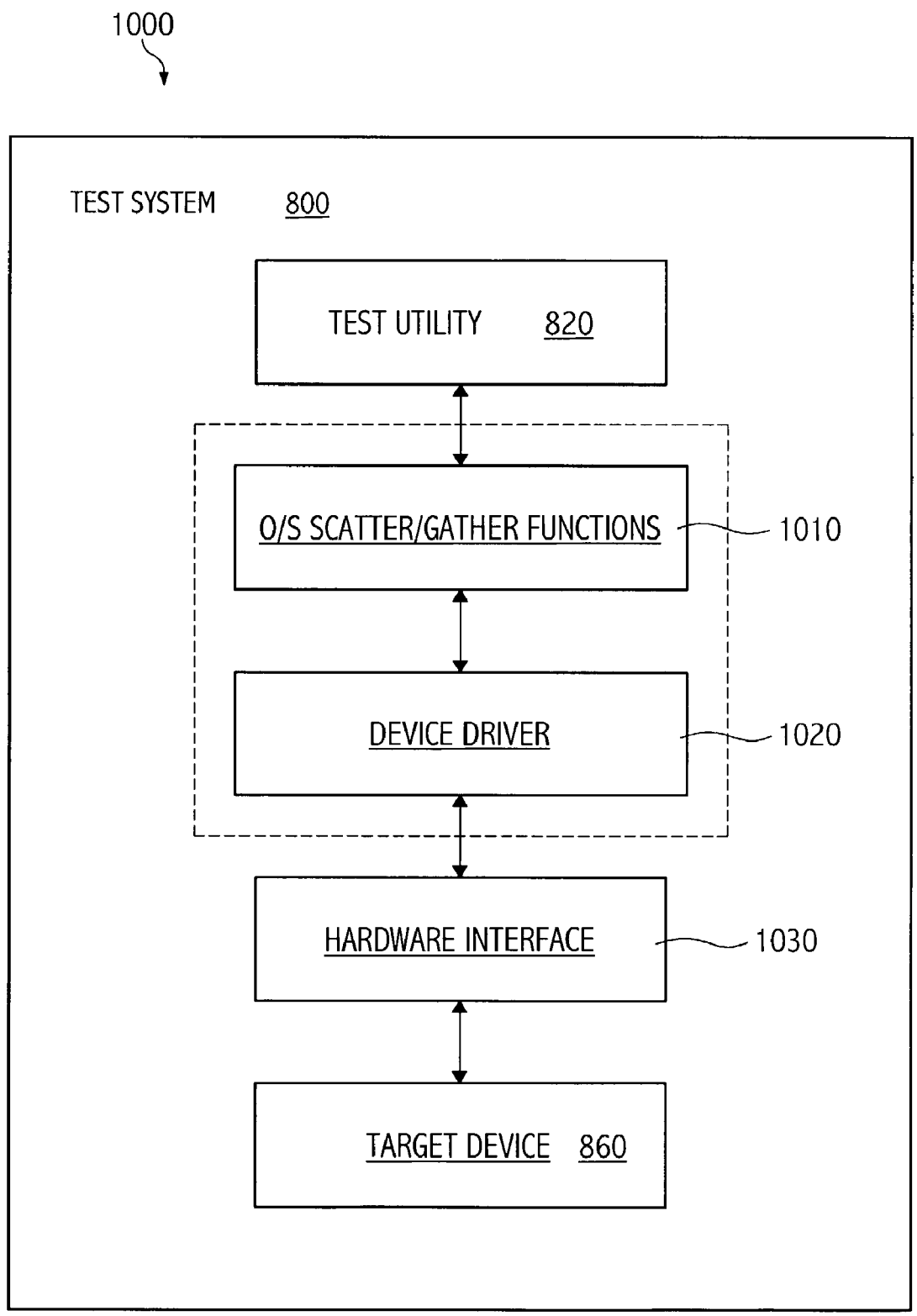
FIG. 10 illustrates interaction between a test utility, operating system and device driver for scatter/gather I/O operations.

In performing the gather function of step 920 and the scatter function of step 960, the test utility 820 (and an operating system on which the test utility runs) may interface with the target device 860 via a device driver. FIG. 10 illustrates the interaction between the test utility 820 and a device driver 1020, a hardware interface 1030, and the target device 860. The device driver 1020 serves as an interface between the target device 860 and the test utility 820. The device driver 1020 is a routine or set of routines that implements the aspects of I/O operations specific to the target device. The hardware interface 1030 may be a bus adapter, for example a SCSI interface card on a PCI bus. Alternatively, the hardware interface 1030 may be a DMA controller that supports scatter/gather DMA.

For example, when the test utility 820 calls the operating system gather function 1010 that directs the operating system to write the contents of a list of buffers to memory on the target device 860, the operating system handles the device-independent aspects of the gather operation but calls routines provided by the device driver 1020 to implement the functions specific to the target device. Therefore, the device driver 1020 is typically provided by a manufacturer of the target device 860. By substituting device drivers, other target devices may be substituted without redesigning the test utility 820. The device driver 1020 may write the gathered data to the target device 860 via the hardware interface 1030.

Similarly, when the test utility 820 calls the operating system scatter function 1010 that directs the operating system to read the contents of memory from the target device 860 to a list of buffers, the operating system calls routines provided by the device driver 1020. The device driver 1020 reads the data from the target device 860 via the hardware interface 1030 and passes the data back to the operating system to be scattered to the designated list of buffers.

Accordingly, the test system 800 may be useful in verifying that the target device 860, operating system scatter/gather functions 1010, device driver 1020 and hardware interface 1030 can each correctly handle scatter/gather I/O operations.

EXAMPLE 3

Scalable Multithreaded System Testing Tool

Another approach to generate a heavy data load is to create multiple test threads, with each test thread performing I/O operations to access the same target device. Such a technique may be optimal for testing a processor or a host bus, due to the rapid context switching an operating system and processor may be required to perform to service multiple threads. Further, in a multi-processor system, complex subsystems may determine which processor services a thread. Therefore, a multithreaded test utility may be used to test how an operating system, processor, or set of processors is able to correctly handle multiple, simultaneous, requests for service.

Figure 11:
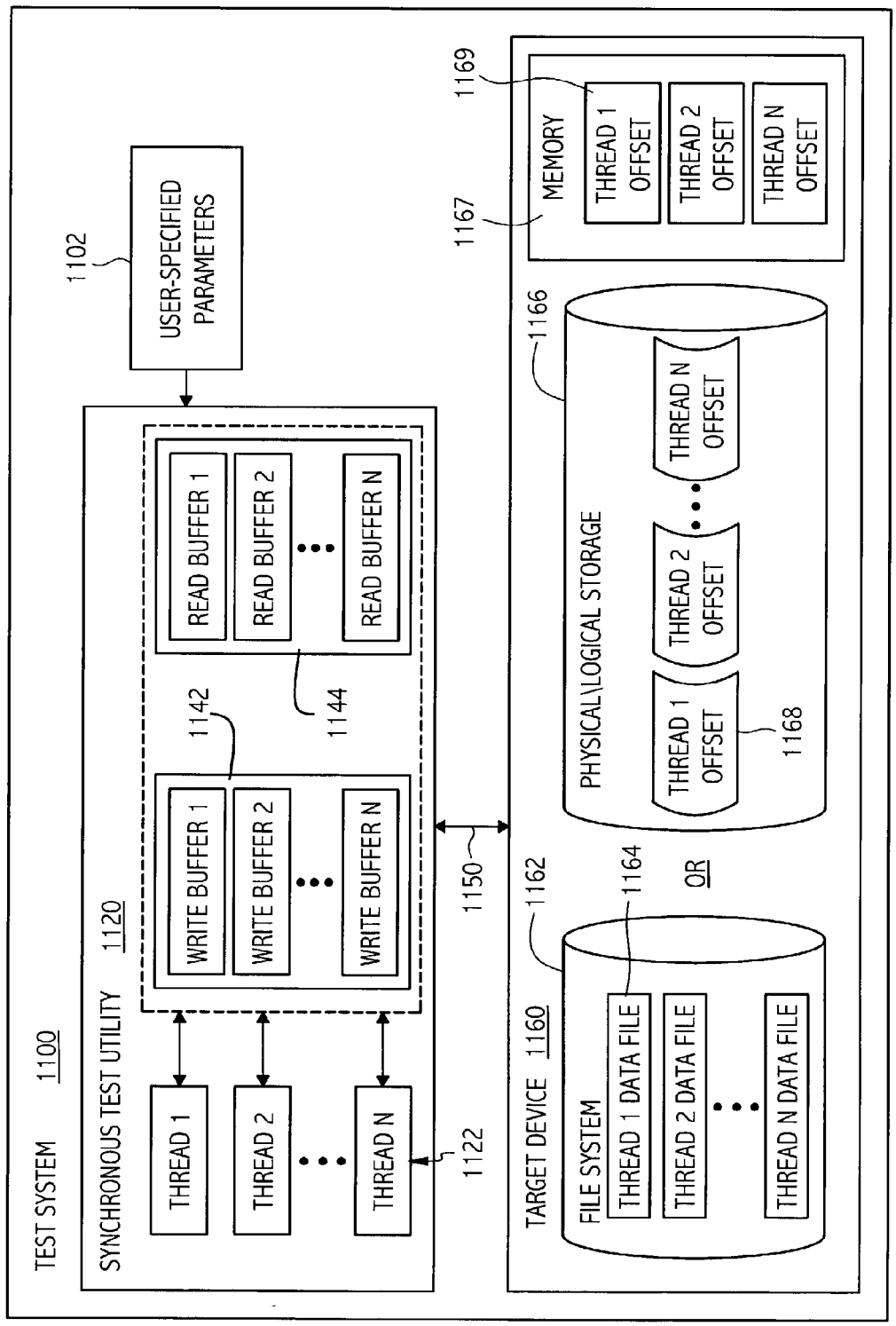
FIG. 11 illustrates one embodiment of a multithreaded system for testing data validity under data loads generated with synchronous input/output (I/O) operations.

FIG. 11 illustrates a test system 1100 with a test utility 1120 using multiple test threads 1122 to access a target device 1160 via a data connection 1150. The test threads 1122 generate a data load on the data connection 1150 by each repetitively writing test data patterns to the target device 1160 and reading data patterns from the target device 1160 using synchronous I/O operations. Each test thread 1122 compares the data patterns read from the target device 1160 to the test data patterns to test for data corruptions.

The target device 1160 may be a local or external storage device, such as a hard drive, a SCSI device, or a redundant array of independent disks (RAID). Accordingly, the data connection 1150 may be any suitable local bus connection, such as a system bus, PCI bus, or ISA bus, or a suitable external connection, such as a SCSI connection or Fibre channel connection. As illustrated, the test utility 1120 may access a file in the form of a single data file 1164 of file system 1162 or an offset range 1168 of physical or logical storage 1166 of the target device 1160. The test utility 1120 may also be configured to access a file in the form of an offset range 1169 of a memory device 1167. User-specified parameters 1102 may include a parameter that specifies a device access type. For example, a user may specify that the file is accessed sequentially, with writes issued to the file up to the end of the file or offset, followed by reads on the next complete pass through the file. Alternatively, the user may specify that access to the file will occur in a random manner, wherein a write is issued to a random valid location in the file that is not in contention with another pending I/O and a read of the location is performed immediately after the write operation is complete.

User-specified parameters 1102 may include a number of test threads, a delay between starting each test thread, a device access type, I/O block size and a starting offset and file or memory length to access. Each test thread 1122 is responsible for accessing a portion of storage or memory on the target device 1160 over the user-specified range. For example, if a user specifies a storage or memory length of 1 MB and 16 threads, each thread would be responsible for a 1 MB portion, for a total of 16 MB accessed. Depending on a user specified device access type, each thread may access a data file 1164 on a file system 1162 or an offset range 1168 of physical or logical storage 1166 or an offset range 1169 of memory 1167. Each test thread 1122 has an associated write buffer 1142 and read buffer 1144, which may be equal in size to the user specified I/O block size.

Figure 12:
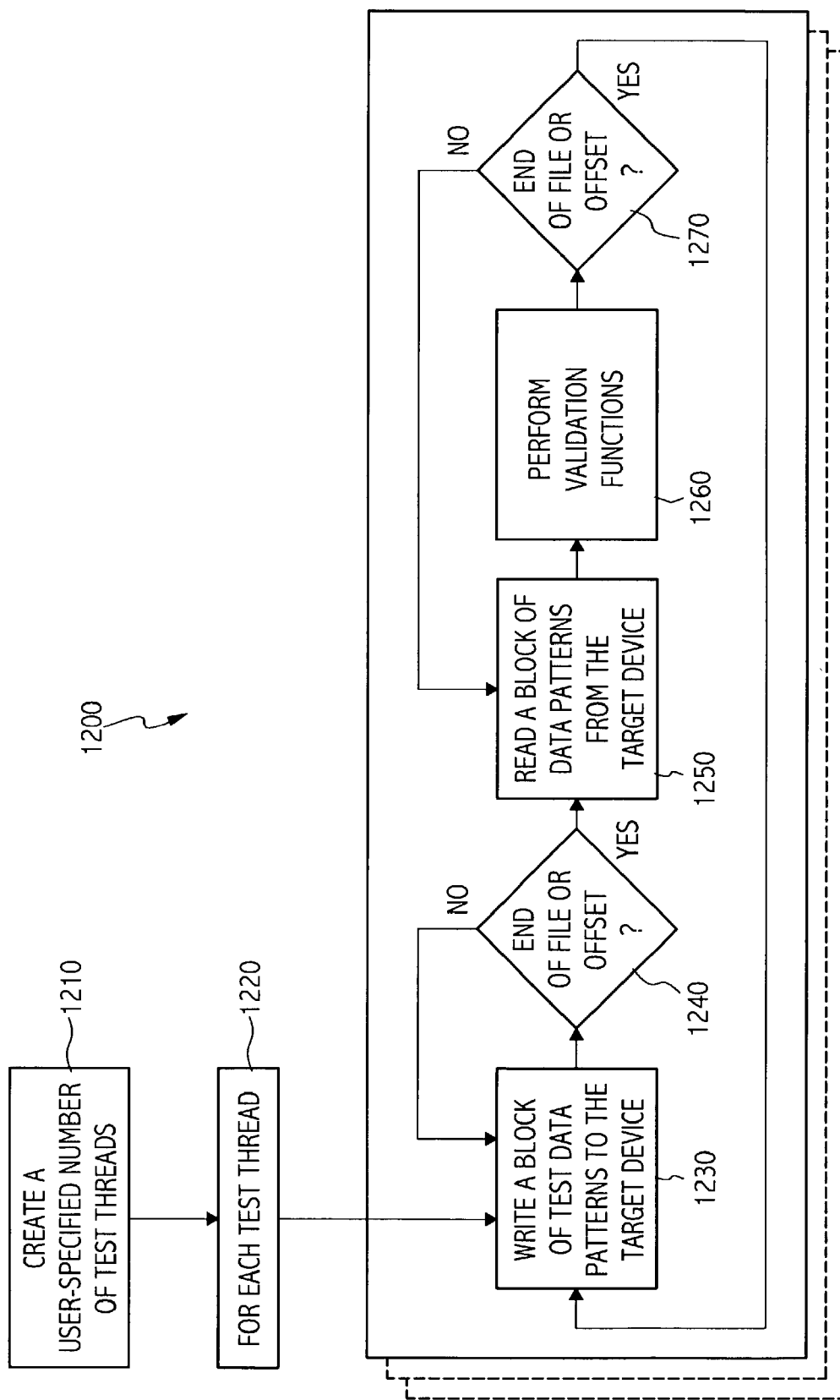
FIG. 12 is a flow diagram illustrating exemplary operations of a method for testing data validity under data loads generated with synchronous I/O operations.

FIG. 12 illustrates exemplary operations of a method that may be performed by the test utility 1120. At step 1210, a user-specified number of threads are created. Each test thread 1122 may be created after the user specified delay between starting each thread has expired. At step 1220, each test thread 1122 performs the operations of steps 1230–1270.

At steps 1230 and 1240, the test thread 1122 repetitively writes blocks of test data patterns to the target device 1160 up to the file size or offset for the test thread 1122, with each block of test data patterns equal in size to the user-specified I/O block size. At steps 1250 through 1270, the test thread 1122 repetitively reads blocks of data patterns from the target device, up to the file size or offset for the test thread 1122, and compares the data patterns read from the target device to the test data patterns written to the target device.

At step 1270, once the file size or offset for the test thread 1122 has been reached, steps 1230 through 1260 are repeated, for example, until a user-specified number of passes has been reached or a user-specified time period has elapsed. The comparison of step 1260 may alternatively be performed after the read operations for the entire file or range have completed (i.e. outside the loop).

Because the threads use a synchronous dispatch method, once the thread issues the I/O operations for steps 1230 and 1250, the thread will not regain control until the write operation is complete. However, as each of the N threads may have an I/O pending, a heavy data load may be maintained. Further, while one of the test threads 1122 is writing test data patterns to the target device 1160 for steps 1230 and 1240, another test thread 1122 may be reading data or validating patterns for steps 1250 and 1260, respectively.

To generate a particularly heavy data load on the processor, host bus, and memory subsystem, the test utility 1120 may be configured in a memory-only mode by targeting the memory device 1167. In the memory-only mode, test data patterns are repetitively written to and read from different offset ranges 1169 of the memory device 1167, which may place a heavy I/O load on the processor, memory subsystems and host bus due to the high speed of memory-only operations. To generate additional I/O stress, a test utility may utilize a custom routine, optimized for speed, for copying memory between different memory locations, rather than a standard memory copy routine, for example, from a C library.

The test utility 1120 may also be configured to access a single sector of a hard drive (i.e. the target device 1160). A sector is a logical segment of data on a hard drive, and is the smallest addressable unit of storage on a disk, typically 512 bytes long. Hard drives commonly have a cache capable of storing at least a sector size of data. After an initial write and read, a single sector of the hard drive may be accessed from the hard drive cache (without accessing physical storage) speeding I/O operations and placing a heavy data load on the system.

EXAMPLE 4

Scalable Multithreaded Network Testing Tool

One approach to generate a heavy data load on a network connection is to use a test system including multiple test clients, with each test client accessing data from a network server file system. Each test client may simulate multiple users by running a multi-threaded test utility, with each thread accessing a different data file on the server. Thus, the test system may generate a high I/O stress on the network file system. The number of test clients, as well as the number of threads for each test client may be varied in an effort to maximize network I/O traffic.

Figure 13:
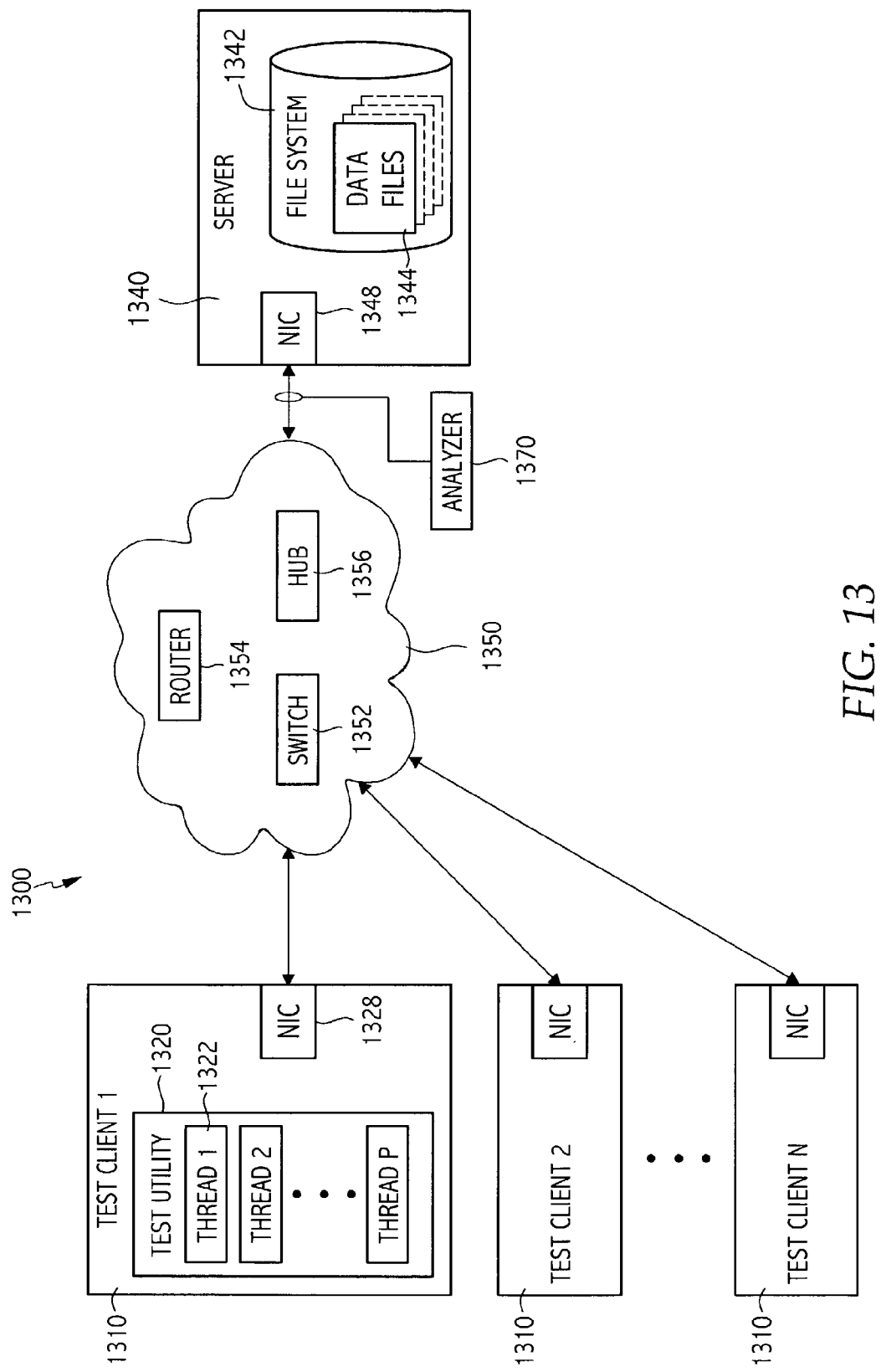
FIG. 13 illustrates one embodiment of a system for testing data validity under data loads generated by accessing a network file server.

FIG. 13 illustrates a test system 1300 including one or more (N) test clients 1310, each connected to a server 1340 through a network connection 1350. Each test client is running a test utility 1320 with one or more (P) test threads 1322 to access a different data file 1344 on a file system 1342 of the server 1340. The test utility 1320 operates similarly to the multithreaded test utility 1120 described above except that device access is limited to a file system 1342. Each test client 1310 contributes to the I/O traffic across the network connection 1350 as the test threads 1322 generate a data load by each repetitively writing test data patterns to and reading data patterns from a corresponding data file 1344. To test for data corruptions, each test thread 1322 compares the data patterns read from the data file 1344 to the test data patterns written to the data file 1344.

The test system may be optimized to generate a maximum amount of traffic across the network connection 1350 by configuring the test clients 1310 so that data transmitted between the client and the server are placed in memory (i.e. cached) only, rather than accessing a physical drive or storage device on the server. For example, a user may specify an I/O block size and file size small enough to be cached by the test clients and the server. This may allow the test system 1300 to generate maximum I/O traffic without having to access a relatively slow storage device, such as a hard drive (at least after an initial access).

The number of test clients 1310 and test threads 1322 may be chosen in an effort to generate a heavy data load on the network connection 1350. An optimum number of test threads 1322 may allow a client to increase full-duplex transmissions, and use a full bandwidth of the NIC 1328. For example, if a test client 1310 is running with at least two threads 1322, a first test thread 1322 may be writing test data patterns to a data file 1344 while a second test thread 1322 is reading data patterns from a different data file 1344, thereby increasing an amount of full-duplex traffic over the network connection 1350. Accordingly, the test system 1300 may generate a high I/O stress on any component in the network data path, such as test client network interface cards (NICs) 1328, server NIC 1348, and any components of the network connection 1350, such as a switch 1352, router 1354, or hub 1356.

The number of test threads 1322 running on a test system 1310 may also be varied by the user in an effort to saturate the network connection 1350. For example, a performance thread of the test utility 1320 may monitor a bandwidth of data through the NIC 1328. If the bandwidth falls below a certain threshold value, a number of test threads 1322 running on the test client 1310 may be adjusted accordingly.

As previously described, an analyzer 1370 may be especially useful in determining data corruptions or signal issues, such as CRC errors, caused by network hubs or switches. Because lower level protocols may detect and fix such data corruptions, for example, with retransmissions, the test utility 1320 may not directly detect such data corruptions or signal anomalies. However, these retransmissions degrade network bandwidth. Therefore, the test utility 1320 may be configured to detect a drop in bandwidth and trigger the analyzer 1370 when the drop in bandwidth is detected. While illustrated as located between the network connection 1350 and the server 1340, one or more analyzers may also be located between the test client 1310 and the network connection 1350.

For some embodiments, the server 1340 may be a network attached storage (NAS) device, or a network attached redundant array of independent disks (RAID) with an integrated RAID controller. The RAID controller may include a cache for caching a common data file loaded from the RAID disks. The NAS device may also include a specific NIC, such as a host bus adapter (HBA), to interface the RAID controller with the network connection 1350, which may be any combination of network media, such as Fibre Channel, Ethernet, iSCSI, or Infiniband.

For example, the test clients 1310 may have Ethernet network connections through Ethernet NICs 1328, while the NAS device has a Fibre Channel connection through the HBA (NIC 1348). The network connection 1350 may include any suitable network components, such as a switch 1352, a router 1354, and a hub 1356 to provide an interface between the different network media. Alternatively, the test client NICs 1328 may also have Fibre Channel HBAs, which may reduce a complexity of the network connection 1350. Regardless of the network details, due to the heavy I/O traffic generated on the network connection 1350, the test system 1300 is well suited for testing all of the network components between the test client 1310 and the server 1340.

Figure 14:
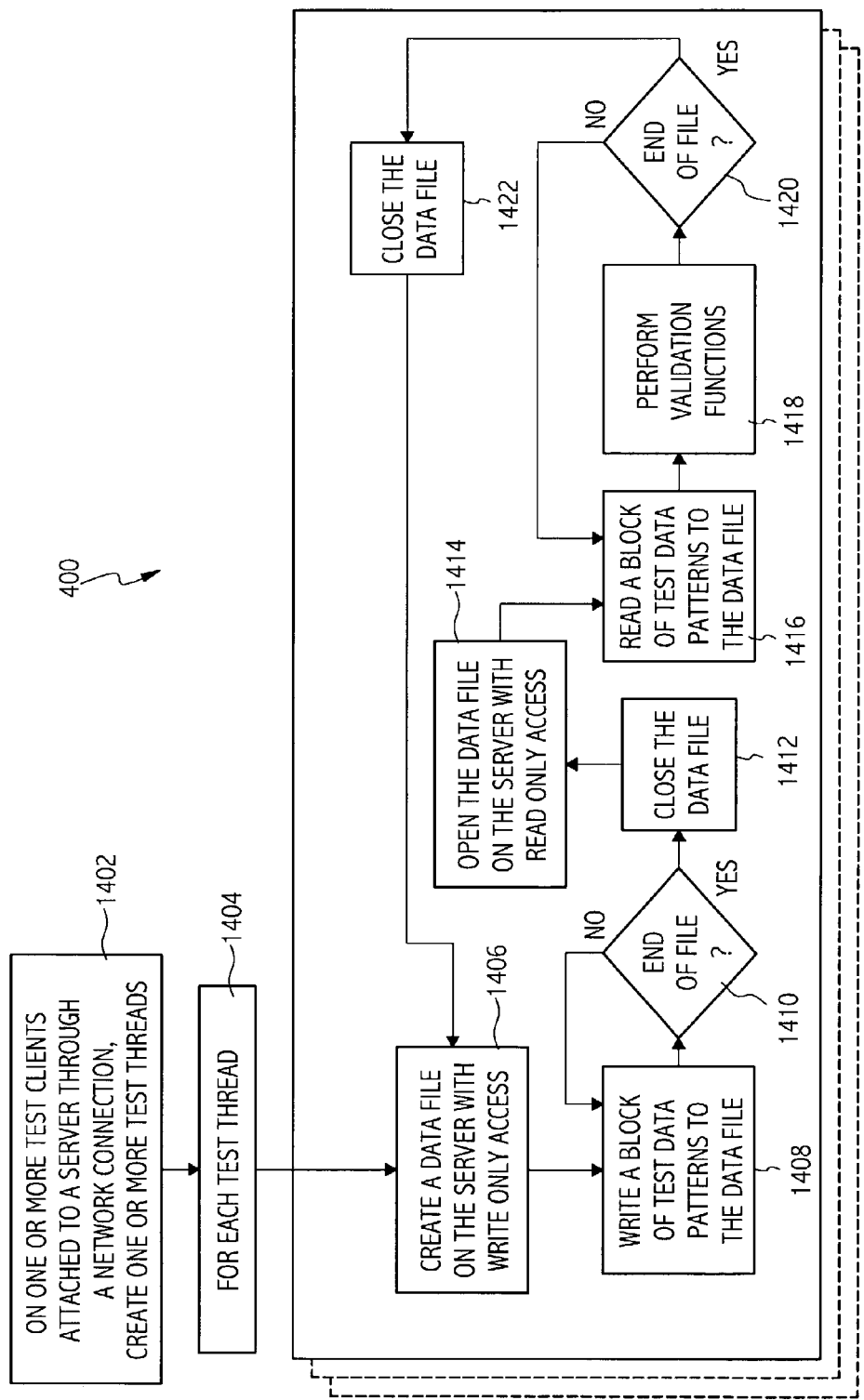
FIG. 14 is a flow diagram illustrating exemplary operations of a method for testing data validity under data loads generated by accessing a network file server.

FIG. 14 illustrates exemplary operations of a method that may be performed by the test utility 1320 running on each of the test clients 1310. At step 1402, one or more test threads 1322 are created on each test utility 1320. A number of test threads 1322 on each test client 1310 may be determined by a user specified parameter or may be predetermined by the test utility 1320. At step 1404, each test thread 1322 performs the operations of steps 1406 through 1422.

At step 1406, the test thread 1322 creates a data file 1344 on the server. For some embodiments, it may important that the data file 1344 is opened in a manner (i.e. with proper sharing flags) that ensures the data file 1344 is not cached by the test client 1310. If the data file 1344 is cached by the test client 1310, after an initial write, the test client 1310 may read the data file 1344 from the cache, rather than access the data file from the server, without generating I/O traffic across the network connection 1350. To prevent the test client 1310 from caching the data file, the test thread 1322 may create the data file 1344 with a write-only access mode. In write-only access mode, the test client 1310 may determine it is never going to read the data file 1344 and should, therefore, not cache the data file 1344. Any other suitable method of ensuring the test client 1310 does not cache the data file 1344 may also be used.

At steps 1408 and 1410, the test thread 1322 repetitively writes blocks of test data patterns (of the user-specified I/O block size) to the data file 1344, up to the file size. At step 1412, once the end of the file is reached, the test thread 1322 closes the data file 1344. This is necessary, for example, if the data file 1344 was opened with a write-only access mode to avoid caching the data file by the test client 1310.

At step 1414, the test thread 1322 opens the data file. This time, the test thread 1322 may open the data file 1344 with read-only access, as the thread will not be writing to the data file. Opening the data file 1344 with read-only access may also enable caching by the server 1340, which may speed operations and help maintain a heavy data load. At steps 1416 through 1420, the test thread 1322 repetitively reads blocks of data patterns from the data file 1344, up to the file size, and performs validation functions for the data patterns read from the data file 1344. The validation functions of step 1418 may alternatively be performed after the read operations for the entire file have completed (i.e. outside the loop).

If data corruptions are detected, the test utility 1320 may take any of the previously described actions (generate debug information, trigger the analyzer 1340, re-read the data file 1344, etc.). If no data corruptions are detected, the data file 1344 is closed at step 1422, and the steps 1406 through 1422 may be repeated as determined by user specified parameters. As previously described, the test data patterns may be modified for each pass to ensure the same data pattern is not written to the same storage location for successive passes.

EXAMPLE 5

Scalable Network Attached Storage (NAS) Testing Tool

Another approach to generate a heavy data load on a network connection is to configure a test system including multiple test clients, with each test client accessing a common data file from a server. The size of the common data file may be kept small enough for caching by the server. Thus, the common data file may be accessed from the server cache without accessing a file system, which may speed operations (i.e. the server storage device does not have to perform seek operations when writing/reading to the common data file). Further, by keeping the block I/O size equal to the file size, the file may be written in a single operation, which may speed the I/O operation and saturate the network connection with I/O traffic. The test system may simulate a real world network with multiple clients accessing common data files on a network file server.

Figure 15:
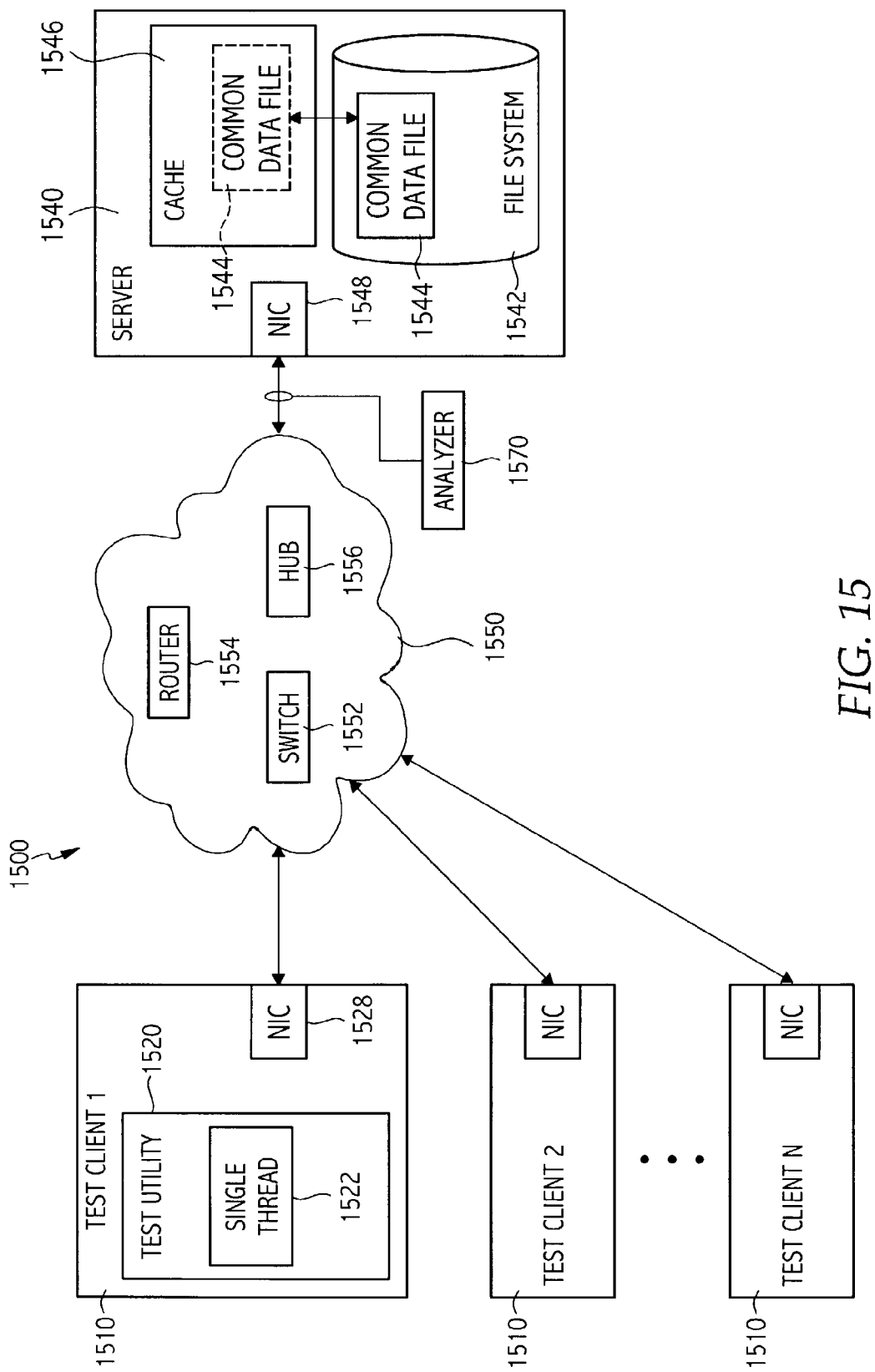
FIG. 15 illustrates one embodiment of a multi-client system for testing data validity under data loads generated by accessing a common data file on a network server.

FIG. 15 illustrates a test system 1500 including one or more test clients 1510, each running a single threaded test utility 1520 to access a common data file 1544 from a server 1540 via a network connection 1550. Each test client 1510 contributes to the I/O traffic across the network connection 1550 as the single thread 1522 repetitively writes test data patterns to a common data file 1544 and reads data patterns from the common data file 1544. To test for data corruptions, each thread 1522 compares the data patterns read from the common data file 1544 to the test data patterns written to their respective data file.

Rather than simulate a large number of users per client (as with the multi-threaded test system of FIG. 14), the test system 1500 may generate heavy I/O traffic with a large number of actual test clients 1510. The number of test clients 1510 may be chosen in an effort to saturate the network connection 1350. For example, the number of clients (N) needed to saturate the network connection may be generally determined by dividing a bandwidth ($BW_{SERVER}$) of the server NIC 1548 by a bandwidth ($BW_{CLIENT}$) of the client NICs 1528 ($N=BW_{SERVER}/BW_{CLIENT}$). For example, if the server NIC 1548 has a bandwidth of 1 GB/s, 10 test clients

1510, each having a 100 MB/s NIC 1528 may be used in an effort to saturate the NIC 1548. If the 100 MB/s bandwidth of each of the client NICs is approached, the 1 GB/s bandwidth of the NIC will be approached. To compensate for time spent by each client for the processing overhead involved in data validation, more clients may be used beyond the general algorithm above.

As illustrated, the server 1540 may be capable of caching the common data file 1544 in a cache 1546, once initially loaded from a file system 1542. Because the size of the data file that may be cached by the server 1540 may vary, the file size is a user-specified parameter. However, because most servers are capable of caching a 4 KB file, a default file size (i.e., if a user does not specify a file size) may be set at 4 KB. Once the common data file 1544 is cached, the test clients 1510 may access the common data file 1544 without interfacing with the file system 1542, which may speed access and generate heavy I/O traffic through the network components.

For some embodiments, the server 1540 may be a network attached storage (NAS) device, or a network attached redundant array of independent disks (RAID) with an integrated RAID controller. The RAID controller may include a cache for caching a common data file loaded from the RAID disks. The NAS device may also include a specific NIC, such as a host bus adapter (HBA), to interface the RAID controller with the network connection 1550, which may be any combination of network media, such as Fibre Channel, Ethernet, iSCSI, or Infiniband.

For example, the test clients 1510 may have Ethernet network connections through Ethernet NICs 1528, while the NAS device has a Fibre Channel connection through the HBA (NIC 1548). The network connection 1550 may include any suitable network components, such as a switch 1552, a router 1554, and a hub 1556 to provide an interface between the different network media. Alternatively, the test client NICs 1528 may also have Fibre Channel HBAs, which may reduce a complexity of the network connection 1550. Regardless of the network details, due to the heavy I/O traffic generated on the network connection 1550, the test system 1500 is well suited for testing all of the network components between the test client 1510 and the server 1540.

Figure 16:
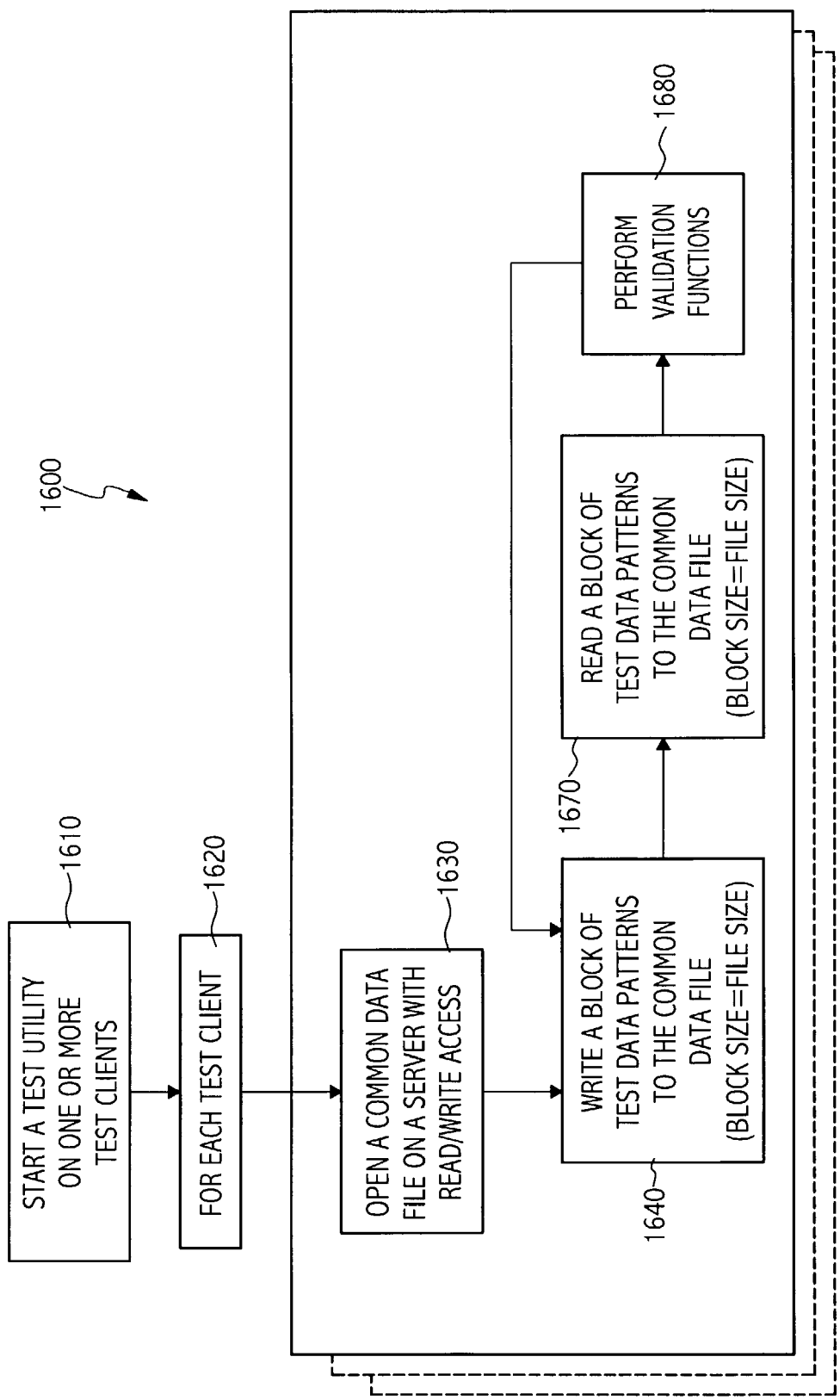
FIG. 16 is a flow diagram illustrating exemplary operations of a method for testing data validity under data loads generated by accessing a common data file on a network server.

FIG. 16 illustrates exemplary operations of a method 1600 that may be performed by the test utility 1520 running on each of the test clients 1510 of FIG. 15 (or the test utility 1620 running on each test clients 1610 of FIG. 16). At step 1610, a test utility is started on multiple test clients 1510 attached to a server through a network connection. At step 1620, each test client 1510 performs the operations of steps 1630–1680.

At step 1630, the test client opens a common data file on the server. As Because the other test clients will access the common data file, the test client will open the data file with both read and write sharing modes, allowing the other test clients to read and write to the common data file.

At steps 1640, the test client writes a block of test data patterns to the common data file. Because the file size is equal to the I/O size, the test data patterns are written to the common data file in a single I/O operation and looping is not necessary as with the previously described methods.

At step 1670 the test client reads data patterns from the common data file in a single operation. At step 1680, the test client compares the data patterns read from the common data file to the test data patterns written to the common data file to test for data corruptions. In response to detecting a data corruption, the test client may perform any of the previously described operations (i.e. generate debug information, trigger an analyzer, re-read the common data file, etc.). Steps 1630–1680 may be repeated for a user-specified number of passes or until a user-specified test time has elapsed.

Because each of the test clients is generating I/O traffic by repetitively writing and reading test patterns to the common data file, the test data patterns in the write buffer cannot be modified on every pass, as with the previously described methods. This is necessary to avoid incorrect data corruptions that may occur if a first client writes a first unique set of data patterns to the common data file and a second test client subsequently writes a second unique set of data patterns to the common data file. When the first clients reads data patterns from the common data file for validation, the second set of unique data patterns will be read, leading to an incorrect data corruption. Therefore, this approach may be best suited for performance measurement tests and tests of signal integrity, in conjunction with an analyzer on the network.

EXAMPLE 6

Scalable Socketed Testing Tool

Another approach to generate a heavy data load on a network is to use a test system including multiple test clients in communication with a test server. Each of the test clients may run a multi-threaded test utility, with each of the test threads establishing a socket connection with the test server. The test clients and test server may be configured so that data is exchanged from memory to memory without accessing physical drives, thus speeding communications and increasing traffic on the network connection. With a large number of clients and threads per client, the test system may simulate a real world network application using TCP, UDP, or multicast protocols. Accordingly, the test system may be useful for testing components on the test clients, test server, or components in the network connection.

Figure 17:
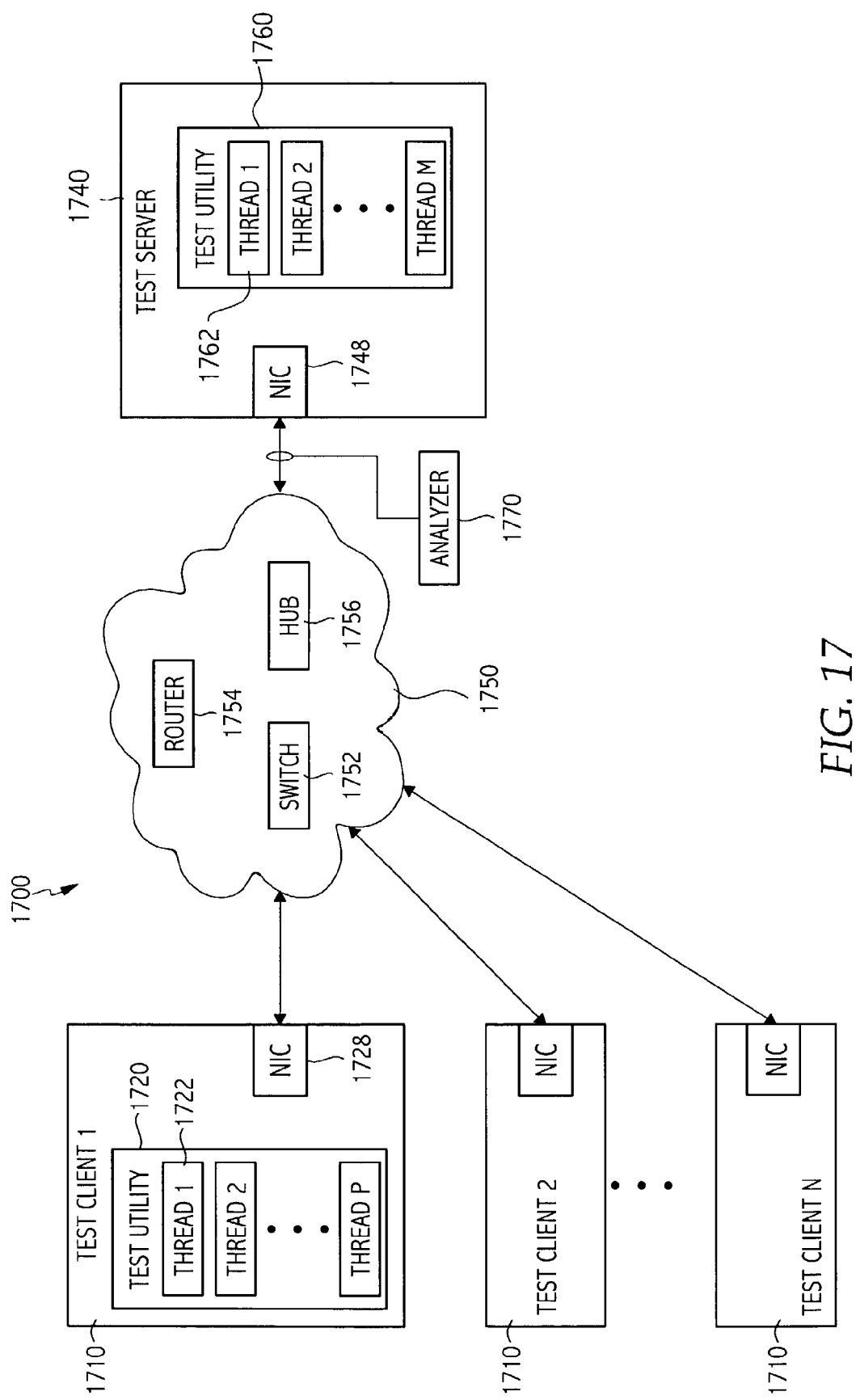
FIG. 17 illustrates one embodiment of a system for testing data validity under data loads generated across one or more socket connections.

FIG. 17 illustrates a test system 1700 including one or more test clients 1710 attached to a test server 1740 via a network connection 1750. A multi-threaded test utility 1720 runs on each of the test clients 1710, with each test thread 1722 of the client test utility 1720 communicating with the test server 1740 via a socket connection. A number of test threads 1762 running on the test server 1740 may be equal to a sum of the client test threads 1722 on each test client 1710. Hence, the test system may also determine how well the test server 1740 can service the multiple threads 1762.

Each test thread 1722 generates I/O traffic on the network connection 1750 by sending test data patterns to the test server 1740 through the socket connections. Each test client 1710 may send a different set of data patterns to the test server 1740, as determined by user specified parameters. Therefore, the test system 1700 may be configured to subject the components of the network connection to I/O stress from a variety of different data patterns in one session. Further, if at least two test threads 1722 are created, an amount of full duplex I/O traffic may be increased. For example, while one test thread is sending data patterns to the test server, another test thread may be receiving data patterns from the test server.

The test sever 1740 may be configured to echo the test data patterns back to the sending test threads 1722 through the socket connection. The test threads 1722 may then test for data corruptions by comparing the echoed data patterns to the test data patterns sent to the test server 1740. In response to detecting a data corruption, a test thread 1722 may perform any of the previously described operations (i.e. generate debug information, trigger an analyzer, re-read the common data file, etc.).

A size of the block of test data patterns to send to the test server may be determined by user specified parameters. For example, the block size may be specified as 1 KB, which would allow the entire block of test data patterns to be sent in a single packet over Ethernet. For larger block sizes, the test data patterns may be fragmented by a driver and sent in multiple packets. A block size may be optimized based on the type of network protocol used, for example, 4 KB I/O blocks for transmission over UDP.

Figure 18:
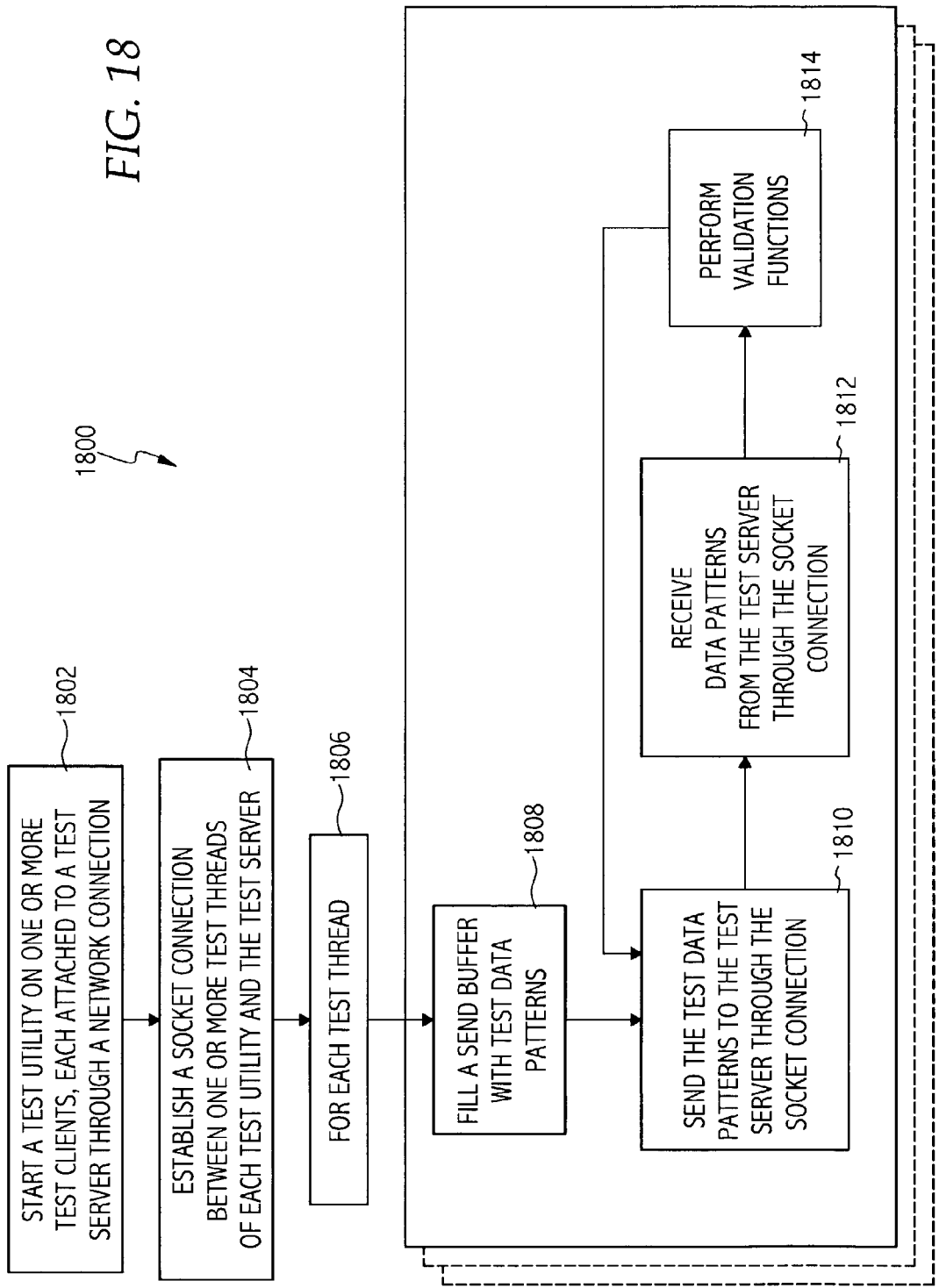
FIG. 18 is a flow diagram illustrating exemplary operations of a method for testing data validity under data loads generated across one or more socket connections.

FIG. 18 is a flow diagram illustrating exemplary operations of a method for testing data validity under data loads generated across one or more socket connections. At step 1802, a test utility is started on one or more test clients, each attached to a test server through a network connection. At step 1804, a socket connection is established between one or more test threads of each test utility and the test server. At step 1806, each test thread performs steps 1808 through 1814.

At step 1808, the client test thread fills a send buffer with test data patterns. For step 1810, the client test thread sends the test data patterns to the test server through the socket connection. At step 1812, the server test thread receives data patterns from the client through the socket connection. The data patterns may be received into a receive buffer. At step 1814, the client test thread performs validation functions, comparing the data patterns received from the test server to the test data patterns sent to the test server to test for data corruptions. For example, the test thread may simply compare the send buffer to the receive buffer. If data corruptions are detected at step 1814, the test thread may generate a debug file and/or trigger an analyzer. If no data corruptions are detected, however, the data patterns in the send buffer may be optionally modified and steps 1810 through 1814 may be repeated.

Figure 19:
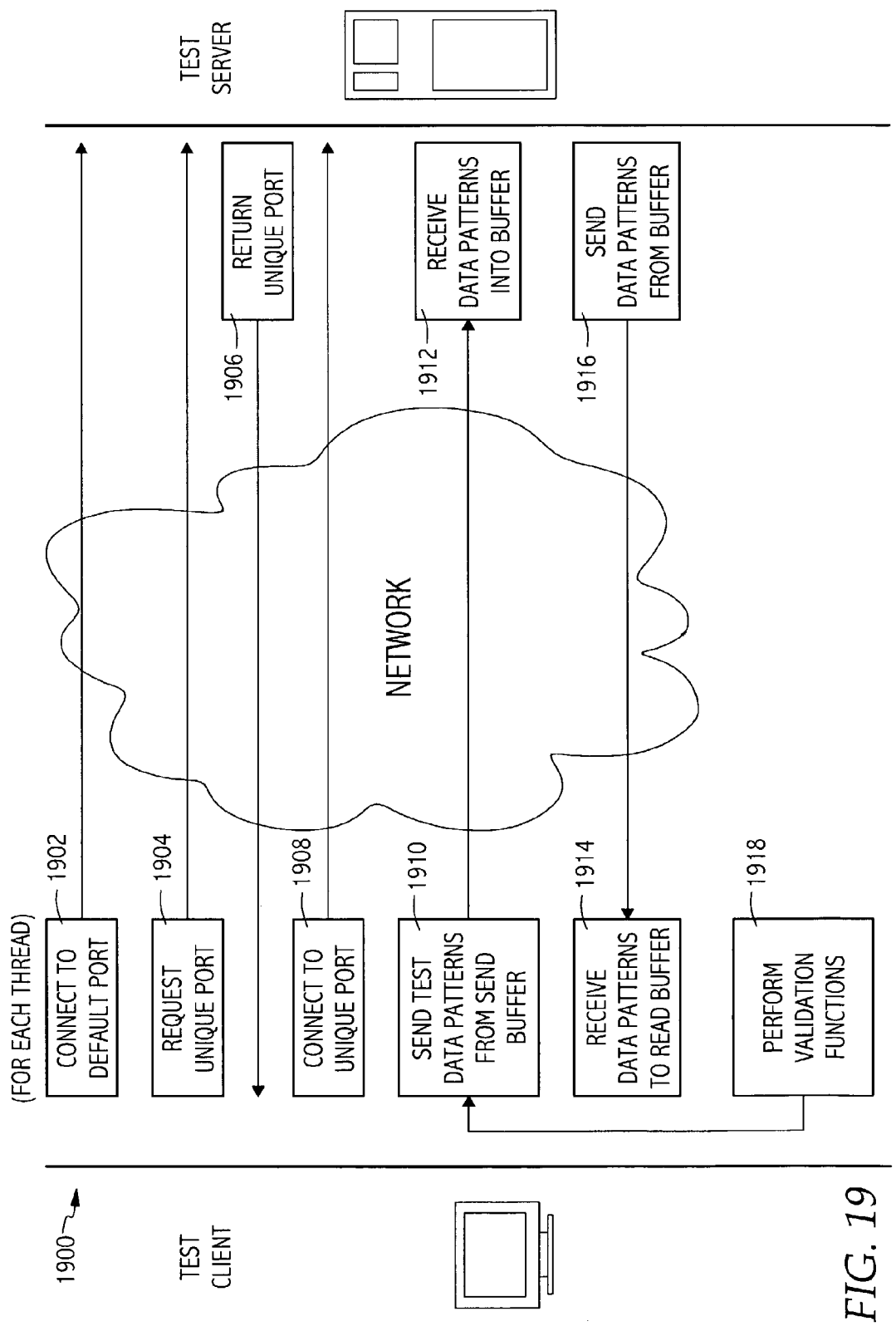
FIG. 19 is a client-server diagram illustrating exemplary operations of a method for testing data validity under data loads generated across a socket connection.
Figure 7:
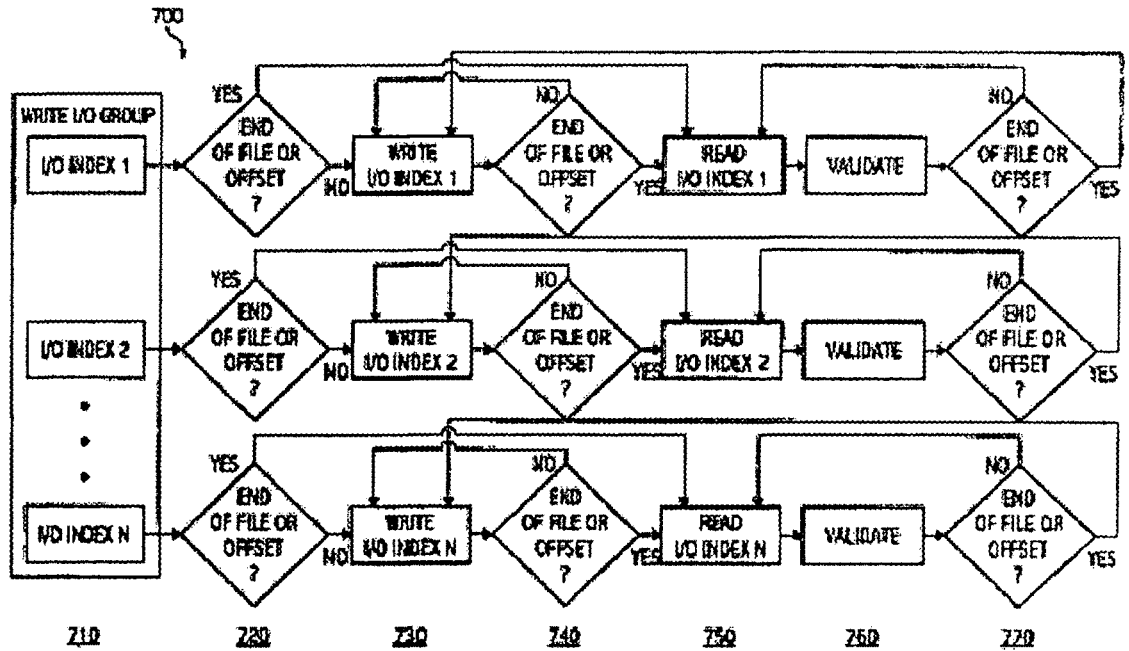
Figure 8:
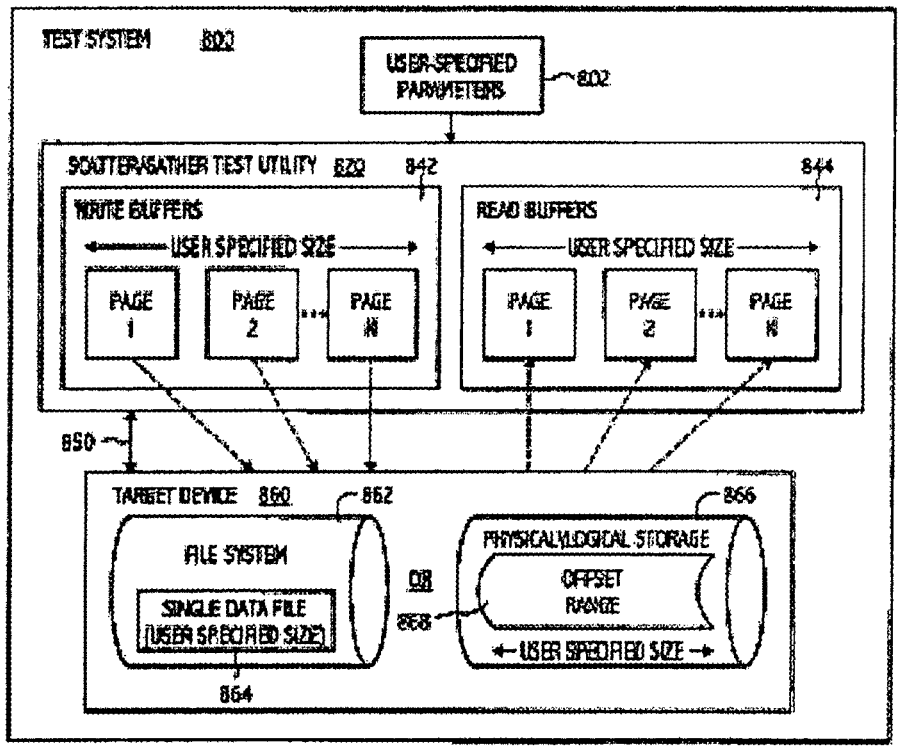

FIG. 19 is a client-server diagram illustrating exemplary operations that may be performed by each test thread and the test server. Steps 1902 through 1908 illustrate one technique for establishing a socket connection between multiple test threads and the test server.

At step 1902, the test thread connects to a default port of the test server. In other words, the test server and the test clients may establish a default port for establishing connections. At step 1904, the test thread requests a unique port. For example, because additional test threads from the same or different test clients may be waiting to connect to the default port, the test thread should close the connection with the default port. At step 1906, the test server returns the unique port. The test server may use any suitable algorithm for assuring a unique port is assigned to each test thread. For example, the test server may keep a list of available ports and monitor which ports have been assigned to test threads. At step 1908, the test client (disconnects from the default port) and connects to the unique port.

Steps 1910 through 1918 mirror the steps 1810 through 1814 of FIG. 18. At step 1910, the test client sends test data patterns from a send buffer to the test server. At step 1912, the test server receives data patterns into a buffer. At step 1914, the test server sends data patterns from the buffer to the test client. At step 1916, the test client receives data patterns in a read buffer. At step 1918, the test thread compares the data patterns received from the test server to the test data patterns sent to the test server to test for data corruptions.

As previously described, a network protocol used for sending data between the test clients and the test server may prevent the test client form detecting a number of data corruptions by a network connecting device, such as a switch, by retransmitting a data packet if an error is detected in a packet. However, a test utility may be configured to detect a decrease in bandwidth resulting from these retransmissions. For example, as previously described, the test utility may create a performance thread to measure data bandwidth between the test client and the test server. If the data bandwidth is below a predetermined threshold value, the test utility may trigger an analyzer 1770. As previously described, the analyzer 1770 may monitor traffic on the network connection and assist in finding data corruptions or signal anomalies that may not be detected by the test utility. Further, as described with reference to FIG. 4B, the test utility may also be configured to trigger an event, which may comprise running a separate application or sending a network message.

For the test systems described above, data corruptions are detected by the test clients. A problem with this is that it may be difficult to determine whether the data corruption was caused when sending the test data patterns from the test client to the test server or when echoing the data patterns from the test server to the test client. However, for some embodiments, data corruptions may also be detected on the test server which may address this problem. A test server detecting a data corruption may notify the sending test client that the data corruption has been detected.

FIG. 20 illustrates exemplary operations that may be performed by a test client and a test server for detecting data corruptions. The operations of steps 2002 and 2004 mirror the operations of step 1802 and 1804 described above. However, at step 2006, each test client sends validation parameters to the test server through one of the socket connections. For example, the test clients may send an indication of the set of data patterns the test client will be using for validation, and a block I/O size to the test server so the test server may perform validation functions on the data patterns it receives from the test clients. Preferably, the validation parameters are sent to the test server prior to generating the heavy I/O traffic on the network connection by repetitively sending the test data patterns.

At step 2008, for each test client, steps 2010 through 2024 are performed by the test client and the test server. At step 2010, the test client sends the test data patterns to the test server through the one or more socket connections. At step 2012, the test server receives data patterns. At step 2014, the test server performs validation functions. For example, the test server may compare the data patterns received to test data patterns indicated by the validation parameters previously received. In response to detecting a data corruption, the test server may perform any of the previously described operations. For example, the test server may trigger an analyzer and generate a debug file. For some embodiments, the test server may be configured to send an error message to the test client to notify the test client of the data corruption.

If a data corruption is not detected at step 2014, the test server may echo data patterns back to the test client at 2020. The remaining steps 2020 through 2024 mirror steps 1812 through 1814 of FIG. 18 previously described, with the test client performing validation functions at step 2024. Accordingly, the method 2000 provides for data validation at the test server and at the test client.

Accordingly, embodiments of the present invention generally provide a suite of test utilities to validate integrity of data transmitted to and from a target device, rather than just measure I/O performance as with conventional analysis tools. The test utilities are scalable to access target storage or memory ranges of various sizes with I/O operations that may also vary in size. Further a number of test threads running on a test client and even a number of test clients may be varied within a test system. By generating a heavy data load on a data connection between a system running the test utilities and a target device, every device and component that handles the data may be subjected to the heavy data load. The test utilities may assist developers in detecting problems in hardware or software. Detecting these problems before a design is finalized may improve cost effectiveness of a design cycle.

While the foregoing is directed to embodiments of the present invention, other and further embodiments of the invention may be devised without departing from the basic scope thereof, and the scope thereof is determined by the claims that follow.

What is claimed is:

1. A system for validating data transmitted over a network connection comprising:
   a server;
   one or more test clients attached to the server through a network connection;
   a library of test data patterns installed on each test client;
   and a test utility installed on each test client, wherein each test utility is configured to:
   (a) generate a data load on the network connection by repetitively writing blocks of test data patterns from a set of test data patterns from the library to a common data file on the server,
   (b) read blocks of data patterns from the common data file,
   (c) compare the blocks of data patterns read from the common data file to the blocks of test data patterns written to the common data file to detect data corruptions,
   (d) measure data throughput while generating the data load,
   (e) and generate debug information if a data corruption is detected.

2. The system of claim 1, wherein a size of the blocks of test data patterns written to the common data file is equal to a size of the common data file.

3. The system of claim 2, wherein the size of the common data file is specified by a user.

4. The system of claim 1, wherein the server is capable of caching the common data file.

5. The system of claim 1, wherein the library of test data patterns installed on each test client comprises at least one of blinking data patterns, walking bit data patterns or checkerboard patterns.

6. The system of claim 5, wherein writing blocks of test data patterns to the common data file comprises writing blocks of test data patterns from a user specified set of test data patterns from the library.

7. The system of claim 1, wherein each test utility is further configured to measure data throughput between the test client and the test server by performing at least one of recording a number of write and/or read operations, recording the elapsed time for pending operations, recording time taken to complete operations, or calculating an amount of data transferred to and from the test server.

8. A system for validating data transmitted over a network connection, comprising:
   a network attached storage device;
   one or more test clients attached to the network attached storage device through the network connection;
   and a test utility installed on each test client, wherein each test utility is configured to:
   (a) generate a data load on the network connection by repetitively writing test data patterns to a common data file on the network attached storage device, wherein each test utility has an offset from other test utilities to avoid write collisions at the network attached storage device,
   (b) read blocks of data patterns from the common data file,
   (c) compare the blocks of data patterns read from the common data file to the blocks of test data patterns written to the common data file to detect data corruptions,
   (d) and generate debug information if a data corruption is detected.

9. The system of claim 8, wherein the test clients are attached to the network connection via a host bus adapter.

10. The system of claim 9, wherein the host bus adapter is a Fibre Channel host bus adapter.

11. The system of claim 8, further comprising an analyzer attached to the network connection, wherein at least one of the test clients is configured to trigger the analyzer in response to detecting a data corruption.

12. The system of claim 11, wherein the analyzer is a Fibre Channel analyzer.

13. A method for testing integrity of data transmitted between one or more test clients and a server through a network connection, comprising:
   (a) creating a test thread on each test client;
   (b) creating a performance thread on each test client;
   (c) for each test thread,
      (i) generating a data load on the network connection by repetitively writing test data patterns to a common data file on the server, wherein each test thread writes the test data patterns to the common data file using an offset from other test threads,
      (ii) reading data patterns from the common data file,
      (iii) comparing the data patterns read from the common data file to the test data patterns written to the common data file to detect data corruptions,
      (iv) and generating debug information if a data corruption is detected;
   (d) and measuring data throughput between each test client and the server with the performance thread on each test client.

14. The method of claim 13, wherein writing test data patterns to the common data file comprises writing blocks of test data patterns equal in size to the common data file.

15. The method of claim 14, wherein the size of the common data file is specified by a user.

16. The method of claim 13, further comprising, for each test thread, opening the common data file on the server with write only access prior to writing test data patterns to the common data file.

17. The method of claim 13, further comprising, for at least one of the test clients: comparing the measured data throughput to a threshold value; and triggering an analyzer if measured data throughput is below, the threshold value.

18. The method of claim 13, further comprising repeating steps (c)(i) through (c)(iv) for each test thread if a data corruption is not detected.

19. The method of claim 18, further comprising repeating steps (c)(i) through (c)(iv) for each test thread until a data corruption is detected, a user specified test timer expires, or steps (c)(i) through (c)(iv) have been repeated a user specified number of times.

20. The method of claim 13, further comprising triggering an analyzer by a test client in response to detecting a data corruption.

21. A computer-readable medium containing a program which, when executed on a computer system, performs operations for validating data transmitted between the computer system and a server through a network connection, the operations comprising:
 (a) generating a data load on the network connection by repetitively writing test data patterns to a common data file on the server;
 (b) reading data patterns from the common data file;
 (c) comparing the data patterns read from the common data file to the test data patterns written to the common data file to detect data corruptions;
 (d) generating debug information if a data corruption is detected;
 (e) and measuring data throughput between the computer system and the server.

22. The computer-readable medium of claim 21, wherein the test data patterns written to the common data file are specified by a user.

23. The computer-readable medium of claim 21, further comprising periodically displaying the measured data bandwidth on a screen of the computer system.

24. The computer-readable medium of claim 21, wherein the operations further comprise opening the common data file on the server with read-write access.

25. The computer-readable medium of claim 21, wherein writing test data patterns to the common data file comprises writing blocks of test data patterns equal in size to the common data file.

26. The computer-readable medium of claim 21, wherein the operations further comprising repeating steps (a) through (e) if a data corruption is not detected.

* * * * *

UNITED STATES PATENT AND TRADEMARK OFFICE
CERTIFICATE OF CORRECTION

PATENT NO. : 7,114,106 B2
APPLICATION NO. : 10/201343
DATED : September 26, 2006
INVENTOR(S) : Klotz et al.

It is certified that error appears in the above-identified patent and that said Letters Patent is hereby corrected as shown below:

Drawings
Sheet 3, replace FIG. 3 with the figure depicted herein below, wherein the parse user selected parameters has been labeled --302--

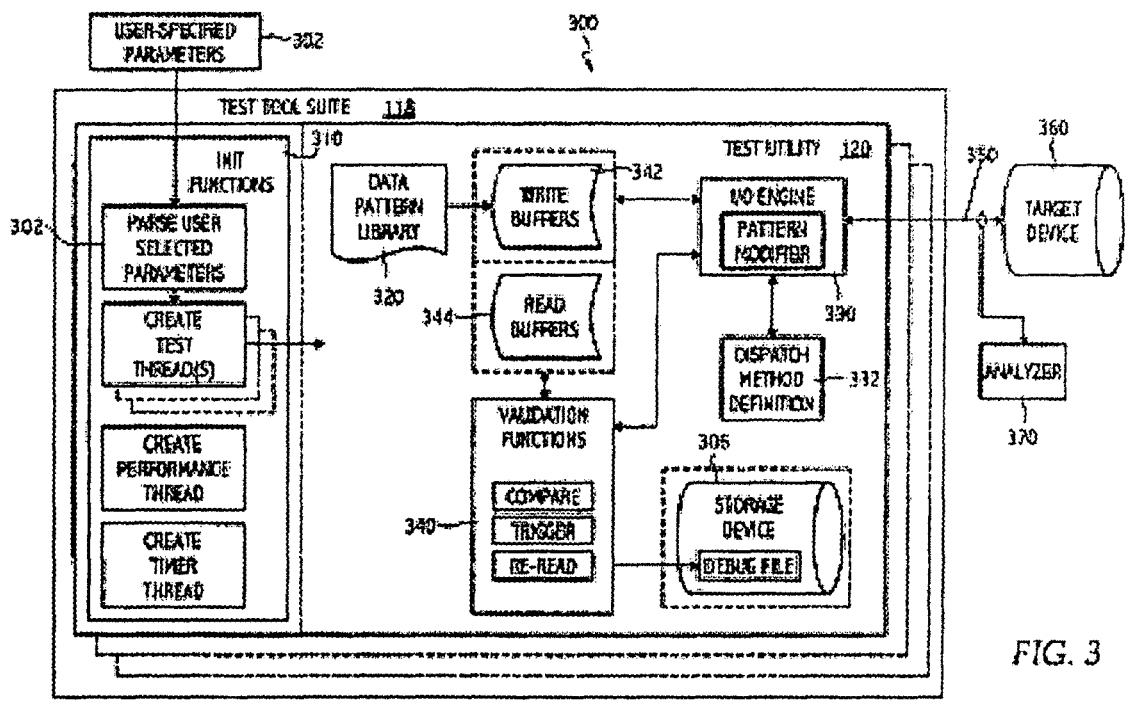

FIG. 3

Signed and Sealed this

Third Day of August, 2010

David J. Kappos
*Director of the United States Patent and Trademark Office*

Drawings
Sheet 4, in the zoomed in portion of FIG. 4A below, label the entire flowchart with the reference --400-- and on the indicated step "440", change "TEST THE FOR DATA" to read --TEST FOR DATA-- as shown below.
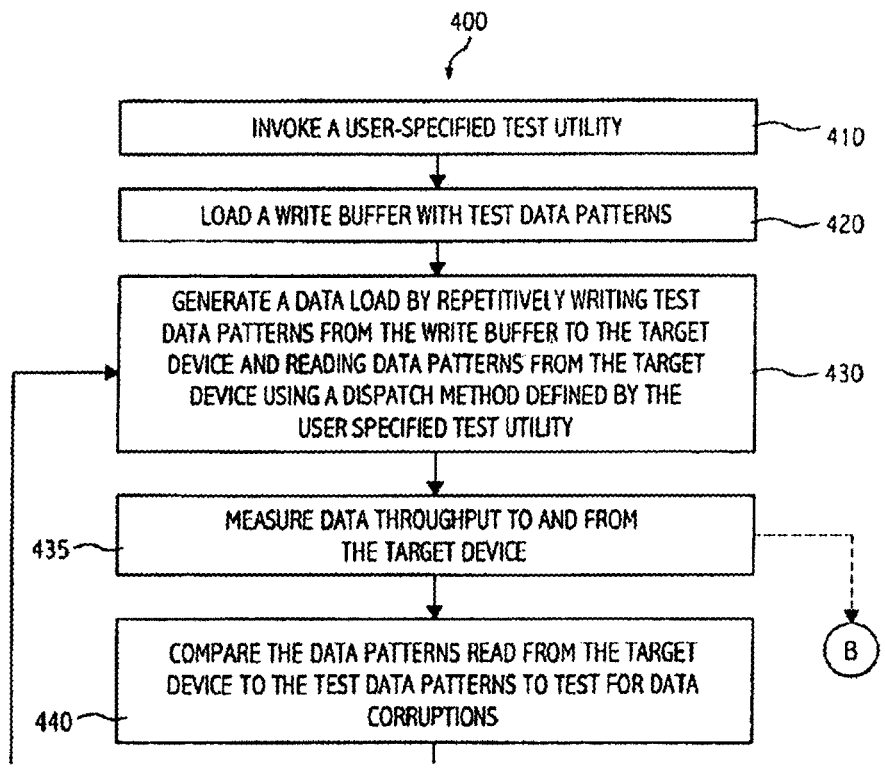

Drawings
Sheet 8, replace FIG. 7 with the figure depicted herein below, wherein "READ I/O INDEX" has been changed to --READ I/O INDEX 2--

Drawings
Sheet 9, replace FIG. 8 with the figure depicted herein below, wherein the data connection has been labeled --850--

Column 5
Line 53, change ",," to --,--

Column 8
Line 23, change "06100" to --00100--

Column 11
Line 20, change "320" to --120--
Line 40, after "However,", remove [f]

Column 14
Line 25, before "suitable", change "an" to --a--
Line 50, remove [508]

Column 22
Line 18, change "1340" to --1370--
Line 62, change "1350" to --1550--

Column 23
Line 53, before "Because", remove [As]
Line 57, change "steps" to --step--

Column 25
Line 56, change "(disconnects" to --disconnects--
Line 57, change "port)" to --port--

Column 27
Line 5, change "Further a" to --Further, a--